US010742937B2

(12) United States Patent
Inoue et al.

(10) Patent No.: US 10,742,937 B2
(45) Date of Patent: Aug. 11, 2020

(54) WATCHING APPARATUS, WATCHING METHOD, AND RECORDING MEDIUM

(71) Applicant: Panasonic Intellectual Property Management Co., Ltd., Osaka (JP)

(72) Inventors: Tsuyoshi Inoue, Nara (JP); Hiroyuki Motoyama, Osaka (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 15/256,511

(22) Filed: Sep. 3, 2016

(65) Prior Publication Data

US 2017/0094230 A1 Mar. 30, 2017

(30) Foreign Application Priority Data

Sep. 30, 2015 (JP) .................. 2015-194349

(51) Int. Cl.
| | |
|---|---|
| *H04N 7/18* | (2006.01) |
| *G06F 3/0487* | (2013.01) |
| *G06K 9/00* | (2006.01) |
| *H04N 5/225* | (2006.01) |
| *H04N 5/232* | (2006.01) |

(52) U.S. Cl.
CPC ........... *H04N 7/185* (2013.01); *G06F 3/0487* (2013.01); *G06K 9/00771* (2013.01); *H04N 5/2252* (2013.01); *H04N 5/2257* (2013.01); *H04N 5/23293* (2013.01); *H04N 7/18* (2013.01); *H04N 5/23216* (2013.01)

(58) Field of Classification Search
CPC ..... G06F 3/0346; G06F 3/04815; G06T 7/20; G06T 7/246; G06T 7/70; G06T 2207/30241; G06T 7/13; G06T 2207/30252; H04N 5/232; H04N 13/366; H04N 5/23219; H04N 13/221
USPC ................ 348/14.02, 148; 345/697; 382/103
See application file for complete search history.

(56) References Cited

U.S. PATENT DOCUMENTS

| | | | | |
|---|---|---|---|---|
| 4,611,771 A | * | 9/1986 | Gibbons ................... | F41G 7/32 244/3.11 |
| 4,777,861 A | * | 10/1988 | Lecuyer .................... | F41G 3/06 89/1.813 |
| 6,067,399 A | * | 5/2000 | Berger .................... | H04N 5/772 386/280 |
| 6,724,915 B1 | * | 4/2004 | Toklu ...................... | G06T 7/248 382/103 |

(Continued)

FOREIGN PATENT DOCUMENTS

| | | |
|---|---|---|
| JP | 2001-339708 | 12/2001 |
| JP | 2006-041747 | 2/2006 |

*Primary Examiner* — Daniel Chang
(74) *Attorney, Agent, or Firm* — Wenderoth, Lind & Ponack, L.L.P.

(57) ABSTRACT

A watching apparatus includes a housing, a display provided on the housing, a camera provided on the housing, a determiner that determines a watching target in a camera image captured by the camera, a position detector that detects a position of the watching target in the camera image, and a display controller that displays an application image that does not include the camera image on the display on the basis of the detected position of the watching target.

20 Claims, 15 Drawing Sheets

(56) References Cited

U.S. PATENT DOCUMENTS

| | | | |
|---|---|---|---|
| 2005/0146600 A1* | 7/2005 | Chipchase | H04M 1/72522 348/14.02 |
| 2009/0262987 A1* | 10/2009 | Ioffe | G06K 9/00281 382/118 |
| 2010/0079508 A1* | 4/2010 | Hodge | G06F 3/013 345/697 |
| 2010/0188426 A1 | 7/2010 | Ohmori et al. | |
| 2010/0260373 A1* | 10/2010 | Neven | G06K 9/228 382/100 |
| 2011/0161999 A1* | 6/2011 | Klappert | H04N 21/4307 725/25 |
| 2013/0188862 A1* | 7/2013 | Lievens | G06T 19/20 382/154 |
| 2013/0286205 A1* | 10/2013 | Okada | H04N 7/18 348/148 |
| 2014/0346225 A1* | 11/2014 | Soffer | G06Q 10/06316 235/380 |

\* cited by examiner

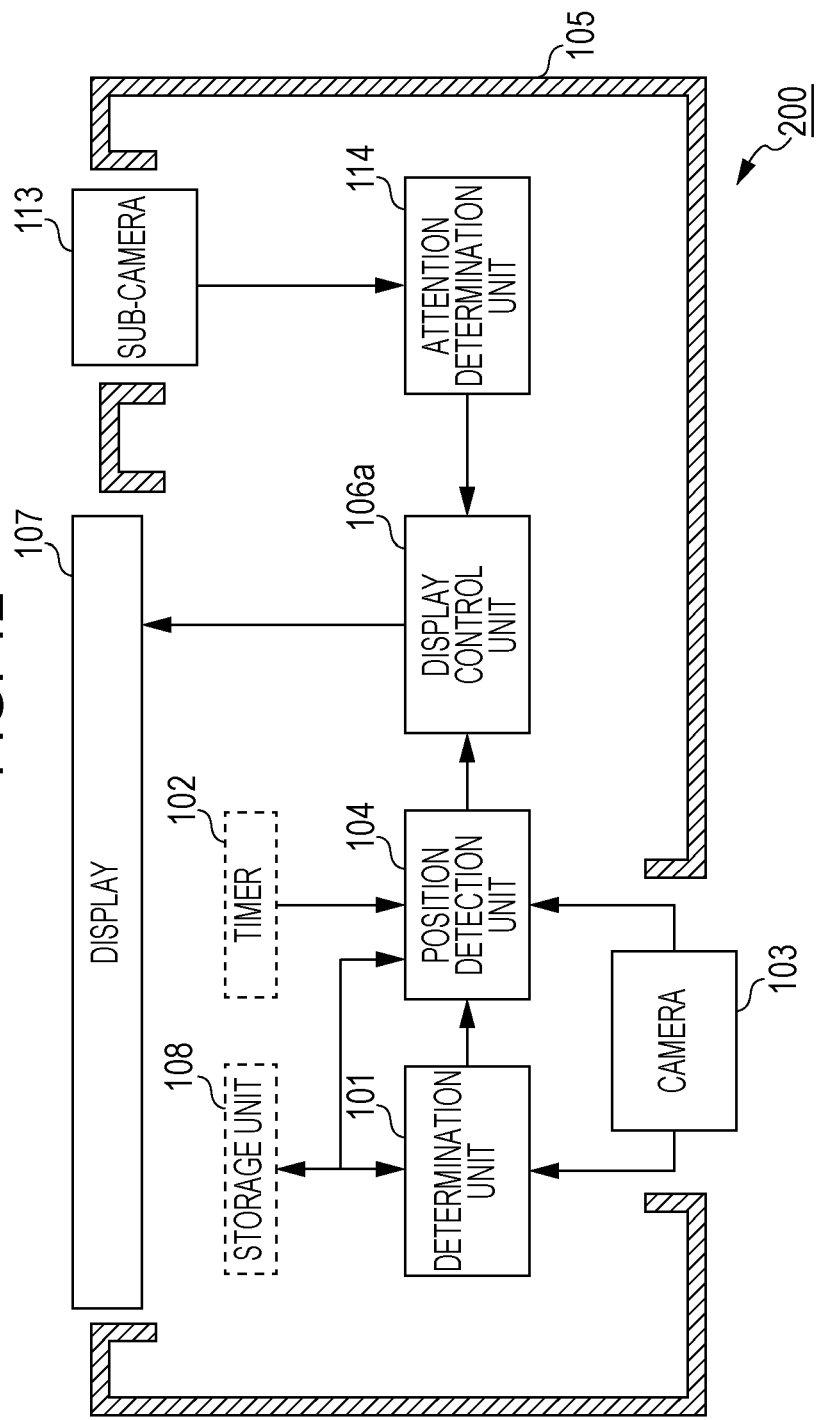

US 10,742,937 B2

WATCHING APPARATUS, WATCHING METHOD, AND RECORDING MEDIUM

BACKGROUND

1. Technical Field

The present disclosure relates to an apparatus, a method, and the like for watching a watching target such as a child.

2. Description of the Related Art

Watching apparatuses for watching watching targets, such as children, have been proposed (e.g., refer to Japanese Unexamined Patent Application Publication No. 2001-339708). A watching apparatus (camera image distribution system) disclosed in Japanese Unexamined Patent Application Publication No. 2001-339708 monitors a child, who is a watching target, using a camera. The watching apparatus then distributes a monitoring image obtained by the camera to a terminal device.

SUMMARY

In the case of the watching apparatus disclosed in Japanese Unexamined Patent Application Publication No. 2001-339708, however, a user might not be able to notice the movement of a watching target and appropriately watch the watching target. That is, since the watching apparatus disclosed in Japanese Unexamined Patent Application Publication No. 2001-339708 monitors a child using an image captured by the camera, a guardian of the child might fail to check the image captured by the camera if the guardian is attracted to an image on a website displayed on a smartphone. As a result, the guardian might not notice when the child has gone far, thereby failing to appropriately watch the child.

One non-limiting and exemplary embodiment provides a watching apparatus and the like for enabling a user to appropriately watch a watching target.

In one general aspect, the techniques disclosed here feature a watching apparatus including a housing, a display provided on a front surface of the housing, a camera provided on a back surface of the housing, a determiner that determines a watching target on the basis of a camera image captured by the camera, and a display controller that displays an application image that does not include the camera image on the display on the basis of a position of the watching target in the camera image.

According to the present disclosure, a watching target can be appropriately watched.

It should be noted that general or specific embodiments may be implemented as a system, a method, an integrated circuit, a computer program, a computer readable storage medium such as a nonvolatile recording medium typified by a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a diagram illustrating a functional configuration of a watching apparatus according to a second embodiment;

DETAILED DESCRIPTION

Figure 1:
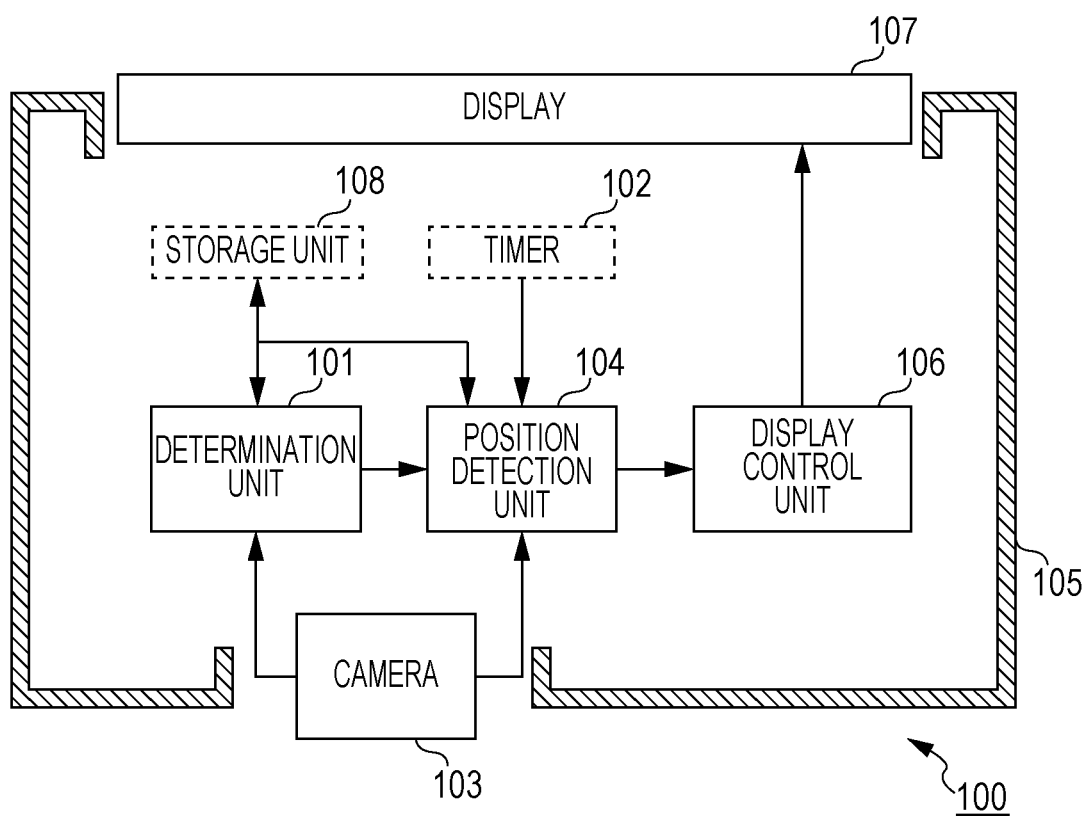
FIG. 1 is a diagram illustrating a functional configuration of a watching apparatus according to a first embodiment.

A watching apparatus according to an aspect of the present disclosure capable of enabling a user to appropriately watch a watching target includes a housing, a display provided on a front surface of the housing, a camera provided on a back surface of the housing, a determiner that determines a watching target on the basis of a camera image captured by the camera, and a display controller that displays an application image that does not include the camera image on the display on the basis of a position of the watching target in the camera image.

As a result, the application image is displayed on the basis of the position of the watching target in the camera image. Since the application image is controlled in accordance with the position of the watching target, the user can understand the position of the watching target even if the user is attracted to the content of the application image. The user, therefore, can appropriately watch the watching target.

For example, the display controller may move the application image on the display on the basis of the position of the watching target.

As a result, since the application image is moved in accordance with the position of the watching target, the user can easily understand a change in the position of the watching target, that is, the movement of the watching target, in accordance with the movement of the application image. The position of the watching target is relative to the camera. If the user moves the watching apparatus, which includes the camera, in accordance with the movement of the application image, therefore, the user can track the watching target. As a result, the application image hardly moves, and the user can track the watching target while viewing the application image.

In addition, if the watching target is not located at a center of the camera image, the display controller may move the application image from a center of the display in a direction of the watching target relative to the center of the camera image.

As a result, if the application image has moved to the right, the user can easily understand that the watching target has moved to the right. On the other hand, if the application image has moved to the left, the user can easily understand that the watching target has moved to the left.

In addition, if the watching target is located at a center of the camera image, the display controller may display the application image on an entirety of the display. If the watching target is not located at the center of the camera image, the display controller may move the application image from a center of the display in a direction of the watching target relative to the center of the camera image.

As a result, if the application image is displayed on the entirety of the application image, the user can easily understand that the watching target is located at the center of the camera image, that is, that the watching target has not largely moved and is located at a safe position. If the application image has moved to the right, the user can easily understand that the watching target has moved to the right from the center of the camera image. On the other hand, if the application image has moved to the left, the user can easily understand that the watching target has moved to the left from the center of the camera image. In addition, when the application image that has been displayed on the entirety of the display is moved to the right, for example, a right part of the application image goes out of the frame. Since the user desires to view the right part, the user automatically moves the watching apparatus to the right. As a result, the position of the watching target in the camera image becomes closer to the center of the camera image, and the right part that has gone out of the frame is displayed on the display again. That is, the user can appropriately track and watch the watching target without particularly paying attention to the watching target, even while viewing the application image.

In addition, if the watching target is not located at the center of the camera image, a relative distance between the center of the camera image and the position of the watching target may be further detected. The display controller may move the application image farther from the center of the display as the relative distance becomes larger.

As a result, as the relative distance of the watching target becomes larger, the application image is moved farther from the center of the display. The user, therefore, can easily understand how much the watching target has moved on the basis of how much the application image has been moved from the center of the display.

In addition, if the watching target is located at a position in the camera image at a time when the watching target has been determined, the display controller may display the application image on an entirety of the display. If the watching target is not located at the position at the time when the watching target has been determined, the display controller may move the application image from a center of the display in a direction of the watching target relative to the position in the camera image at the time when the watching target has been determined.

As a result, if the application image is displayed on the entirety of the display, the user can easily understand that the watching target is located at the position in the camera image at the time when the watching target has been determined, that is, that the watching target has not largely moved and is located at a safe position. If the application image has moved to the right, the user can easily understand that the watching target has moved to the right from the position at the time when the watching target has been determined. On the other hand, if the application image has moved to the left, the user can easily understand that the watching target has moved to the left from the position at the time when the watching target has been determined.

In addition, if the watching target is not located at a center of the camera image, the display controller may move the application image in a direction of the watching target relative to the center of the camera image and reduce a size of the application image.

As a result, since the size of the application image is reduced, a ratio of a part of the application image that goes out of the frame when the application image is moved can be reduced even if the application image has been moved to the right or left. The ratio here refers to a ratio of the area of the part of the application image that goes out of the frame to the area of the entirety of the application image. The user, therefore, can understand the content of the application image even when the application image has been moved.

A change in the position of the watching target in the camera image in a depth direction may be detected. If it is detected that the watching target has moved away from the camera in the depth direction, the display controller may reduce a size of the application around a center of the display.

As a result, since the size of the application image is reduced, the user can easily understand that the watching target has moved away in the depth direction.

In addition, a relative distance of the watching target may be detected. If the relative distance of the watching target is larger than a certain distance, the display controller may display the camera image on the display, and if the relative distance of the watching target is equal to or smaller than the certain distance, the display controller may display the application image on the basis of the detected position of the watching target.

As a result, if the relative distance of the watching target is larger than the certain distance, the camera image is displayed on the display instead of the application image. The user, therefore, can easily understand, on the basis of the switching to the camera image, that the watching target has gone far and might not be safe.

In addition, the watching apparatus may further include a sub-camera provided on the housing and an attention determiner that determines whether a user is paying attention to the watching target on the basis of movement of at least a part of the user's face in a sub-camera image captured by the sub-camera. If the attention determiner determines that the user is paying attention to the watching target, the display controller may display the application image closer to the center of the display than when the attention determiner has determined that the user is not paying attention to the watching target.

As a result, since the application image hardly moves while the user is paying attention to the watching target, it is possible to prevent the application image from meaninglessly becoming hard to view. That is, the application image is easy to view for a user who is paying attention to the watching target.

Another aspect of the present disclosure is a watching apparatus including a housing, a display provided on a front surface of the housing, a camera provided on a back surface of the housing, the camera capturing a first camera image and camera images including a second camera image and a third camera image, the camera capturing the camera images after the camera captures the first image, a determiner that determines a watching target on the basis of the first camera image, a position detector that detects positions of the watching target in the camera images, the positions including a first position of the watching target in the second camera image and a second position of the watching target in the third camera image, a display controller that displays an application image on the display without displaying the first camera image and the camera images on the display, wherein the display controller determines display positions, on the display, where a predetermined position of the application image is located, based on the detected positions, where a length between a second display position where the predetermined position of the application image is located based on the second position and the center of the display is bigger than a length between a first display position where the predetermined position of the application image is located based on the first position and the center of the display if a length between the center of the third image and the second portion is bigger than a length between the center of the second image and the first portion, wherein the display positions including the first display position and the second display position, and wherein the first position is the center of a face of the watching target in the second camera image and the second position is the center of a face of the watching target in the third camera image.

Embodiments will be specifically described hereinafter with reference to the drawings.

The following embodiments are general or specific examples. Values, shapes, materials, components, arrangement positions and connection modes of the components, steps, the order of the steps, and the like are examples, and do not limit the present disclosure. Among the components described in the following embodiments, ones not described in the independent claims, which define broadest concepts, will be described as arbitrary components.

First Embodiment

FIG. 1 is a diagram illustrating a functional configuration of a watching apparatus according to a first embodiment.

A watching apparatus 100 includes a housing 105, a determination unit 101, a timer 102, a camera 103, a position detection unit 104, a display control unit 106, a display 107, and a storage unit 108. The display 107 and the camera 103 are arranged on the housing 105. More specifically, the display 107 is provided on a front surface of the housing 105. The camera 103 is provided on a back surface of the housing 105.

Figure 2A:
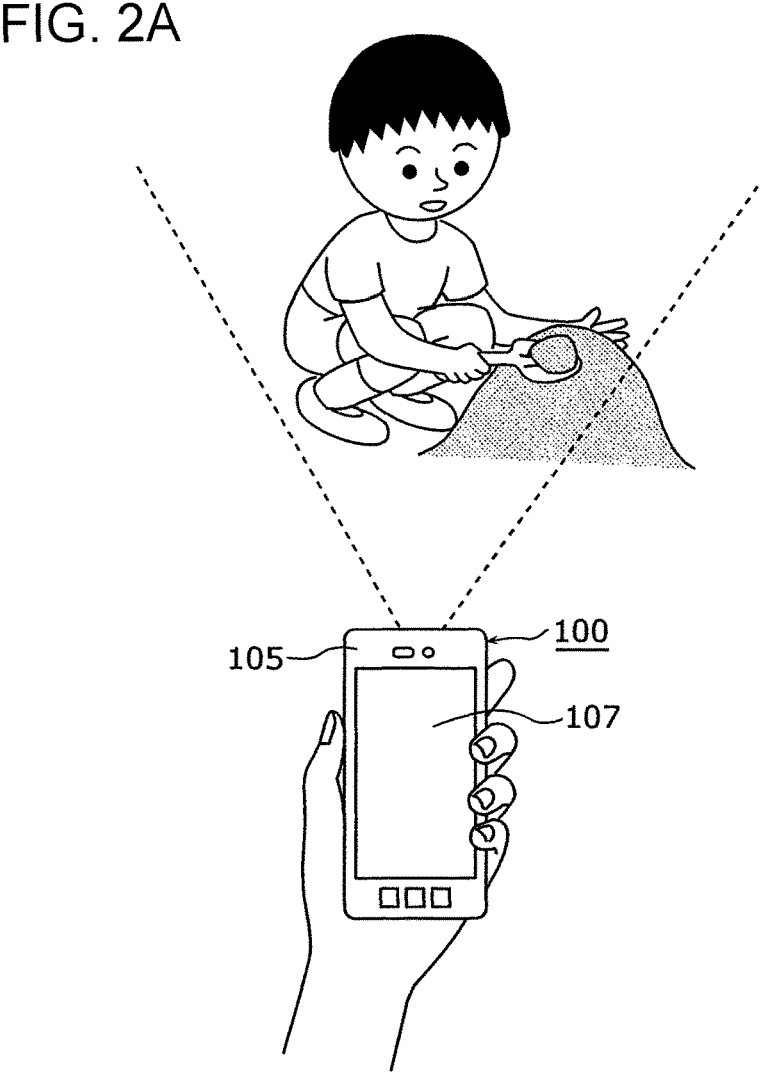
FIG. 2A is a diagram illustrating an example of a scene in which the watching apparatus is used according to the first embodiment.
Figure 2B:
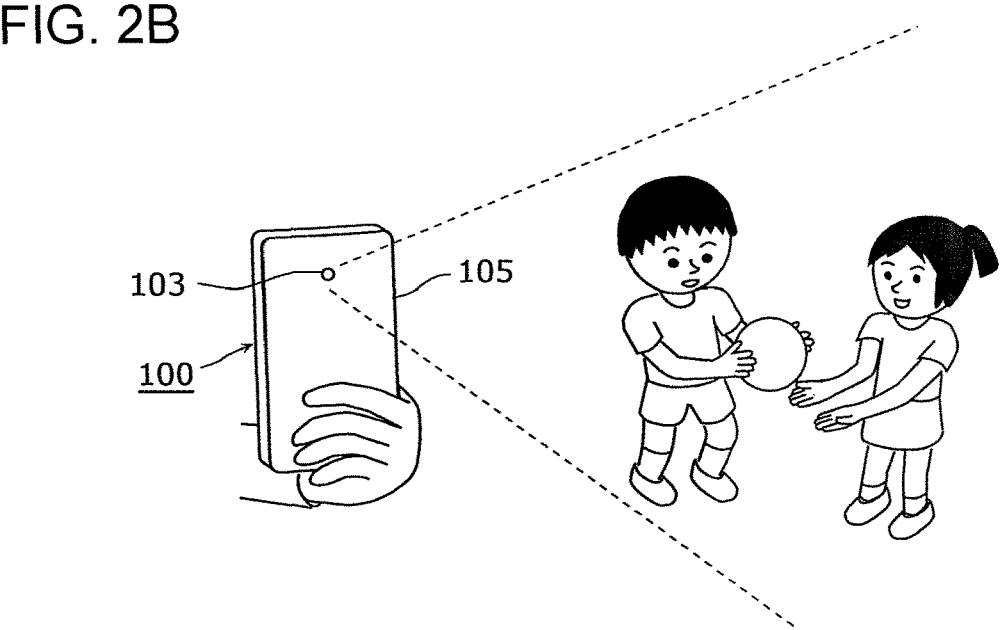
FIG. 2B is a diagram illustrating another example of the scene in which the watching apparatus is used according to the first embodiment.

FIGS. 2A and 2B illustrate examples of a scene in which the watching apparatus 100 is used. As illustrated in FIG. 1, the housing 105 includes the front surface on which the display 107 is provide and the back surface on which the camera 103 is provided. The watching apparatus 100, which has the shape of the housing 105, is, for example, a mobile terminal such as a smartphone.

A user operates or views an image of an application program (hereinafter referred to as an "application image") displayed on the display 107 of the housing 105. The application program will be referred to as an "application" or an "app" hereinafter. The camera 103 captures a camera video image including a watching target. The watching apparatus 100 displays, on the display 107, the application image indicating a position of the watching target without displaying the camera video image. As a result, the user learns the position of the watching target even while operating or viewing the application image.

As illustrated in FIG. 2A, for example, the camera 103 captures a camera video image including a watching target who is a child playing with sand as a watching target. The watching apparatus 100, however, indicates a position of the watching target through a display mode of an application image displayed on the display 107 without displaying the camera video image on the display 107. In another case, as illustrated in FIG. 2B, the camera 103 captures a camera video image including two children playing with a ball as watching targets. At this time, the watching apparatus 100 determines one of the two children as the watching target. The watching apparatus 100 then indicates a position of the watching target, who is one of the two children, through a display mode of an application image displayed on the display 107 without displaying the camera video image on the display 107.

Display 107

The display 107 is provided on the front surface of the housing 105. The display 107 is, for example, a liquid crystal display or an organic electroluminescent (EL) display. The display 107 includes a screen.

Camera 103

The camera 103 is provided on the back surface of the housing 105. The camera 103 captures an image around the housing 105. An image captured by the camera 103 will also be referred to as a "camera video image". A camera video image includes a plurality of camera images. A plurality of camera images refer to camera images captured at different times. That is, a camera video image is a moving image, and a camera image is a still image.

Timer 102

The timer 102 measures the time and transmits a present time to the position detection unit 104. Although the watching apparatus 100 according to the present embodiment includes the timer 102, the watching apparatus 100 need not include the timer 102.

Storage Unit 108

The storage unit 108 stores a target determination rule for determining the watching target as described above. The storage unit 108 is also used for storing temporary data used in a process performed by the position detection unit 104. Although the watching apparatus 100 includes the storage unit 108, the watching apparatus 100 need not include the storage unit 108. That is, the storage unit 108 may be a storage unit outside the watching apparatus 100. The storage unit 108 may be connected to the watching apparatus 100 by wire or wirelessly and communicate information with the watching apparatus 100.

Determination Unit 101

The determination unit 101 determines the watching target in a camera video image captured by the camera 103. That is, the determination unit 101 determines the watching target in a camera image captured by the camera 103. The watching target is a moving object such as a person or an animal.

In order to determine the watching target, first, the determination unit 101 receives a camera video image captured by the camera 103 and determines at least one candidate in the camera video image. In the example illustrated in FIG. 2B, for example, the determination unit 101 determines the two children as candidates.

More specifically, the determination unit 101 obtains a candidate having a certain size or more from a camera video image. More specifically, the determination unit 101 identifies, in a camera image, an edge including a plurality of pixels whose luminance values are different from luminance values of adjacent pixels by a certain value or more. The determination unit 101 then determines, as a candidate, an object having a certain size (area) or more among objects surrounded by identified edges, each including a plurality of pixels. Alternatively, the determination unit 101 may determine a candidate using a function of recognizing a face or a function of recognizing a human body.

If a camera video image includes a candidate (e.g., the example illustrated in FIG. 2A), the determination unit 101 determines, with the user's approval, the candidate as the watching target. When a camera image is displayed on the screen, for example, the determination unit 101 determines the watching target on the basis of the user's touch on the screen or the user's determination operation performed by the user on the housing 105. Alternatively, the determination unit 101 may determine a candidate as the watching target without the user's approval.

On the other hand, if a camera video image includes a plurality of candidates (e.g., the example illustrated in FIG. 2B), the determination unit 101 determines one of the plurality of candidates as the watching target on the basis of a selection operation performed by the user or using the target determination rule stored in the storage unit 108. According to the target determination rule, for example, a candidate located closest to the center of a camera video image is determined as the watching target. In another case, according to the target determination rule, a candidate having a shape most similar to a predetermined shape (a so-called "template") is determined as the watching target. The predetermined shape is, for example, the shape of a person or an animal viewed from the front, the side, or off-center. That is, the determination unit 101 determines a candidate, among at least one candidate included in a camera video image, most similar to the template as the watching target. In other words, the determination unit 101 obtains the shape of a candidate and performs pattern matching between the obtained shape of the candidate and the template to determine the watching target. Alternatively, the determination unit 101 may determine a candidate having a registered facial feature as the watching target using the function of recognizing a face. Similarly, the determination unit 101 may determine a candidate having a registered bodily feature as the watching target using the function of recognizing a human body.

When the determination unit 101 determines one of a plurality of candidates as the watching target on the basis of a selection operation performed by the user, the determination unit 101 highlights the plurality of candidates on the display 107. The determination unit 101 then determines one of the plurality of candidates selected by the user as the watching target.

Figure 3:
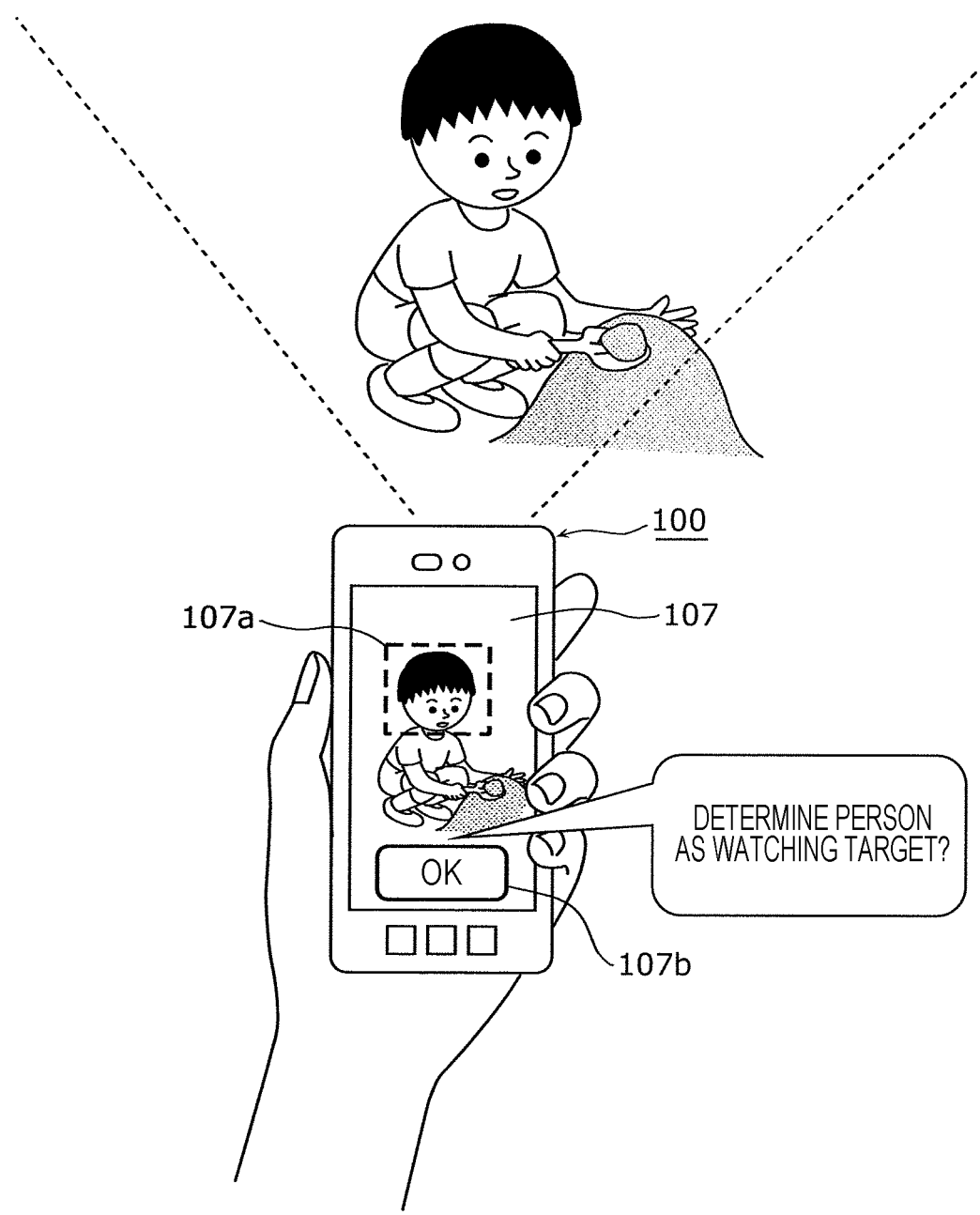
FIG. 3 is a diagram illustrating an image displayed on a display in order to determine a candidate as a watching target according to the first embodiment.

FIG. 3 illustrates an image displayed on the display 107 in order to determine a candidate as the watching target.

A camera video image captured by the camera 103, for example, is displayed on the display 107 on the basis of control performed by the display control unit 106. After determining a candidate in camera images included in the camera video image, the determination unit 101 causes the display control unit 106 to highlight the determined candidate. As illustrated in FIG. 3, for example, a frame 107a is displayed on the display 107 around the face of the candidate, who is a child. That is, the determination unit 101 recognizes the candidate's face using the function of recognizing a face or the like and causes the display control unit 106 to display the frame 107a around the candidate's face. The candidate is thus highlighted using the frame 107a. Furthermore, a message, "Determine the person as the watching target?", and a button 107b for enabling the user to approve are displayed on the display 107. If the user touches the button 107b, the determination unit 101 obtains the user's approval. That is, the determination unit 101 obtains the user's approval for the determination of the highlighted candidate as the watching target. After obtaining the user's approval, the determination unit 101 determines the candidate as the watching target.

Figure 4:
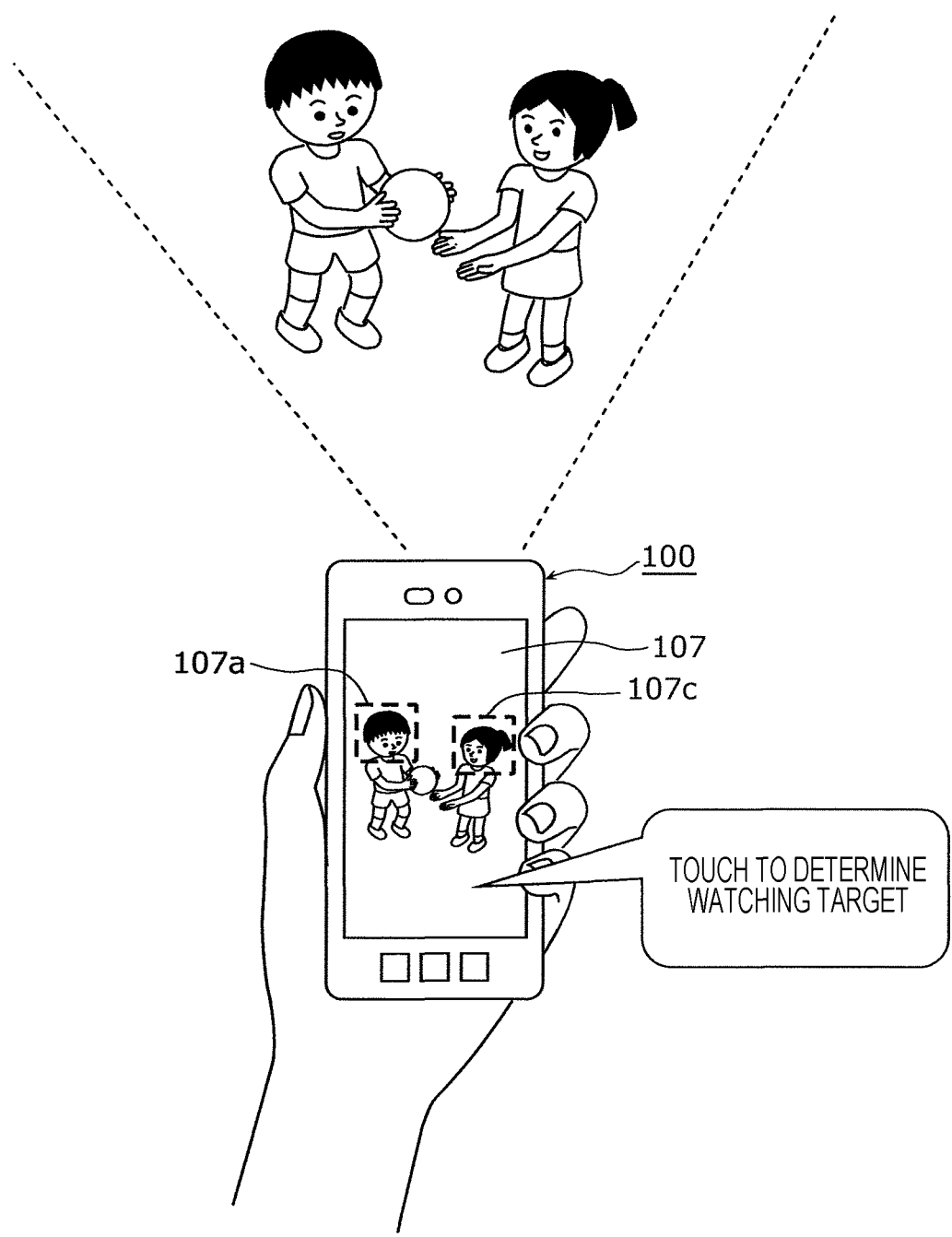
FIG. 4 is a diagram illustrating an image displayed on the display in order to determine one of two candidates as the watching target according to the first embodiment.

FIG. 4 illustrates an image displayed on the display 107 in order to determine one of two candidates as the watching target.

A camera video image captured by the camera 103, for example, is displayed on the display 107 on the basis of control performed by the display control unit 106. After determining candidates in camera images included in the camera video image, the determination unit 101 causes the display control unit 106 to highlight the determined candidates. As illustrated in FIG. 4, for example, frames 107a and 107c are displayed on the display 107 around the faces of the two candidates, who are children. That is, the determination unit 101 recognizes the candidates' faces using the function of recognizing a face or the like and causes the display control unit 106 to display the frames 107a and 107c around the candidates' faces. The candidates are thus highlighted using the frames 107a and 107c. Furthermore, a message, "Touch to determine the watching target", is displayed on the display 107. If the user touches one of the frames 107a and 107c, the determination unit 101 determines the candidate touched by the user as the watching target.

Figure 5:
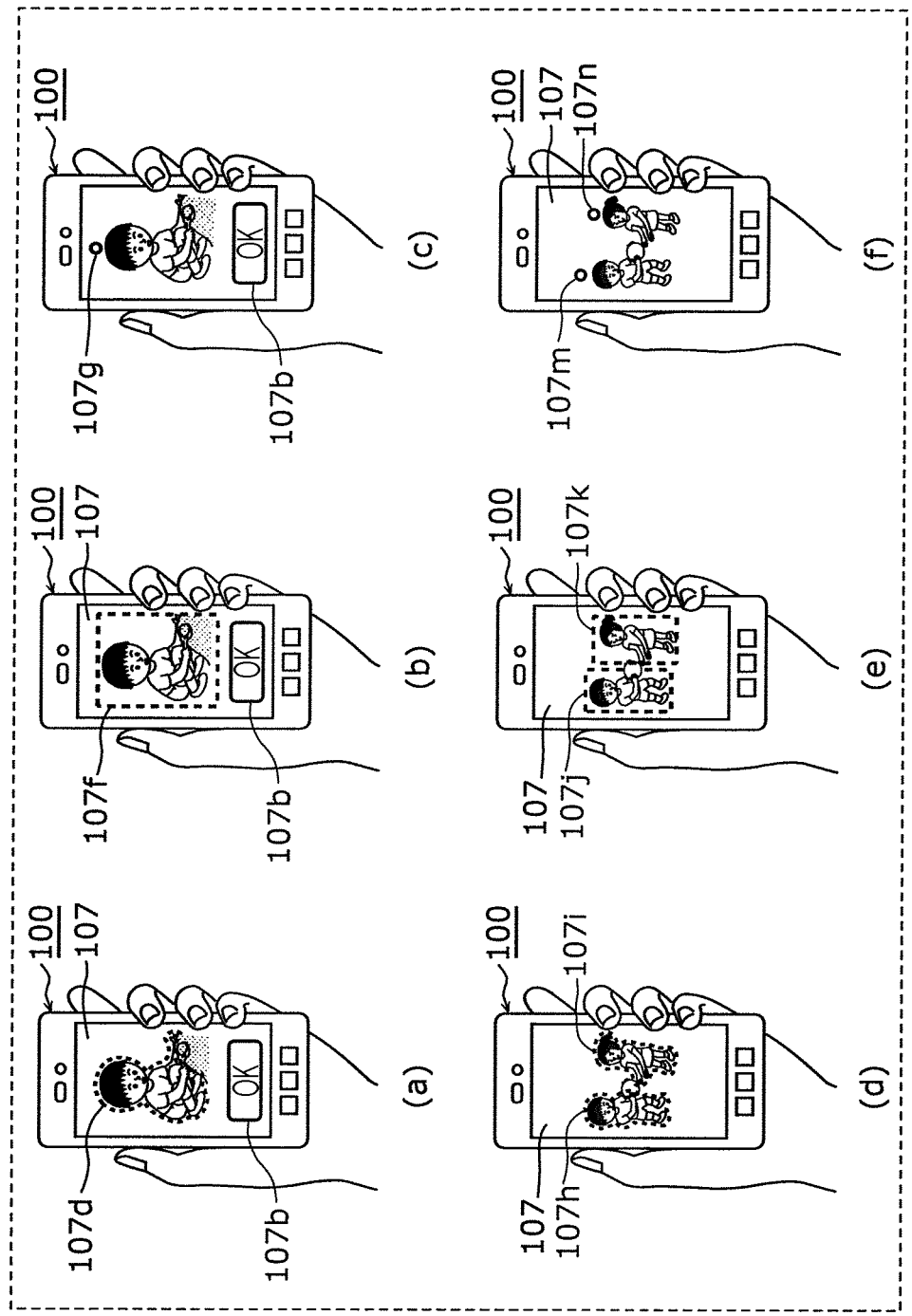
FIG. 5 is a diagram illustrating examples in which a candidate(s) is highlighted according to the first embodiment.

FIG. 5 illustrates other examples in which a candidate(s) is highlighted.

In the examples illustrated in FIGS. 3 and 4, candidates are highlighted by displaying frames around the candidates' faces. An object for highlighting a candidate, however, is not limited to such a frame. As illustrated in FIGS. 5(a) and 5(b), the display 107 may display frames 107d, 107h, and 107i, which surround the whole bodies of candidates, around the candidates as objects for highlighting candidates. Alternatively, as illustrated in FIGS. 5(b) and 5(e), the display 107 may display rectangular frames 107f, 107j, and 107k, which surround the whole bodies of the candidates, around the candidates as objects for highlighting candidates. Alternatively, as illustrated in FIGS. 5(c) and 5(f), the display 107 may display circles 107g, 107m, and 107n above the candidates as objects for highlighting candidates. When the circles 107g, 107m, and 107n are displayed, the determination unit 101 determines, as the watching target, a candidate corresponding to a circle closest to a position at which the user has touched the display 107.

Aside from the examples illustrated in FIG. 5, for example, the display 107 may display an elliptical frame surrounding the whole body of a candidate or a cross at the center of a candidate's body as an object for highlighting a candidate.

Position Detection Unit 104

The position detection unit 104 detects a position of a watching target determined by the determination unit 101 in a camera video image. The position of the watching target is defined by, for example, a vertical position and a horizontal position in a camera image, or the sum of positions of pixels including information regarding the watching target in a camera image. Alternatively, the position of the watching target may be the center of the watching target's body, the center of the watching target's face, or the center of the watching target's chest.

The position detection unit 104 also detects a relative distance and a relative direction of the watching target on the basis of a change in the position of the watching target. More specifically, when the watching target is not located at the center of a camera image, the position detection unit 104 detects a distance in the camera image between the center of the camera image and the position of the watching target. This distance, which is the relative distance, refers not to an actual traveling distance of the watching target but to the distance in the camera image between the watching target and the center of the camera image. In this case, the position detection unit 104 also detects the direction of the watching target relative to the center of the camera image as the relative direction of the watching target. Although the center of a camera image is used as a reference position for the relative distance and direction here, the reference position may be different from the center of the camera image. For example, the reference position may be a position of the watching target in a camera image at a time when the determination unit 101 has determined the watching target. That is, if the watching target is not located at the position in a camera image at the time when the determination unit 101 has determined the watching target, the position detection unit 104 detects a distance between the position in the camera image at the time when the determination unit 101 has determined the watching target and the current position of the watching target. In this case, the position detection unit 104 also detects the direction of the watching target relative to the position in the camera image at the time when the determination unit 101 has determined the watching target as the relative direction of the watching target.

Since the relative distance and direction are determined on the basis of a positional relationship between the camera 103 (that is, the watching apparatus 100) and the watching target, the relative distance and direction change not only when the watching target has moved but also when the watching apparatus 100 has moved. The center of a camera image need not be a central point but may be an area of a certain size that includes the central point.

Alternatively, the reference position may be a position of the watching target detected in the past. That is, the position detection unit 104 may detect the relative distance of the watching target on the basis of a distance between a position of the watching target detected in the past and a position of the watching target detected later. In addition, the position detection unit 104 may detect the relative direction of the watching target on the basis of a position of the watching target detected at a certain time relative to a position of the watching target detected earlier.

For example, the position detection unit 104 identifies a time at which the position of the watching target has been detected as a detection time on the basis of a present time transmitted from the timer 102. The position detection unit 104 may then store the detection time and the position of the watching target in the storage unit 108. The position detection unit 104 stores a detection time and a position, for example, each time the position detection unit 104 detects the position of the watching target. Furthermore, after detecting the position of the watching target as a current position, the position detection unit 104 obtains the position of the watching target a certain period of time ago from the storage unit 108 as a past position. The position detection unit 104 then detects the relative distance and direction of the watching target using the current position and the past position.

Furthermore, the position detection unit 104 may detect not only the vertical position and horizontal position of the watching target in a camera image but also a position of the watching target in the camera image in a depth direction. For example, the position detection unit 104 detects the position of the watching target in the depth direction on the basis of the size of the watching target in a camera image. That is, as the size of the watching target becomes smaller, the position of the watching target in the depth direction relative to the watching apparatus 100 detected by the position detection unit 104 becomes farther.

In addition, the position detection unit 104 may detect changes in the position of the watching target in a camera image in the depth direction by repeatedly detecting the position of the watching target in the depth direction. That is, the position detection unit 104 may detect a distance in the depth direction between a reference depth position and the current position of the watching target. The reference depth position is, for example, a position of the watching target in the depth direction at the time when the determination unit 101 has determined the watching target.

Display Control Unit 106

The display control unit 106 controls the display 107 on the basis of the position of the watching target detected by the position detection unit 104. That is, the display control unit 106 displays an application image that does not include a camera image on the display 107 on the basis of the detected position of the watching target. More specifically, the display control unit 106 changes a position of the application image on the display 107 on the basis of the position of the watching target. The application image is a moving or a still image that does not include a camera video image. The application image may be a text including letters, signs, or the like, instead. The application image is an image used by an application and, more specifically, for example, is an image used by a web browser for viewing information on the Internet. The application is not limited to a web browser but may be, for example, a mailer, a map application, a railroad or bus traffic information application, or a game. Such an application will be referred to as a "display app" hereinafter.

Figure 6:
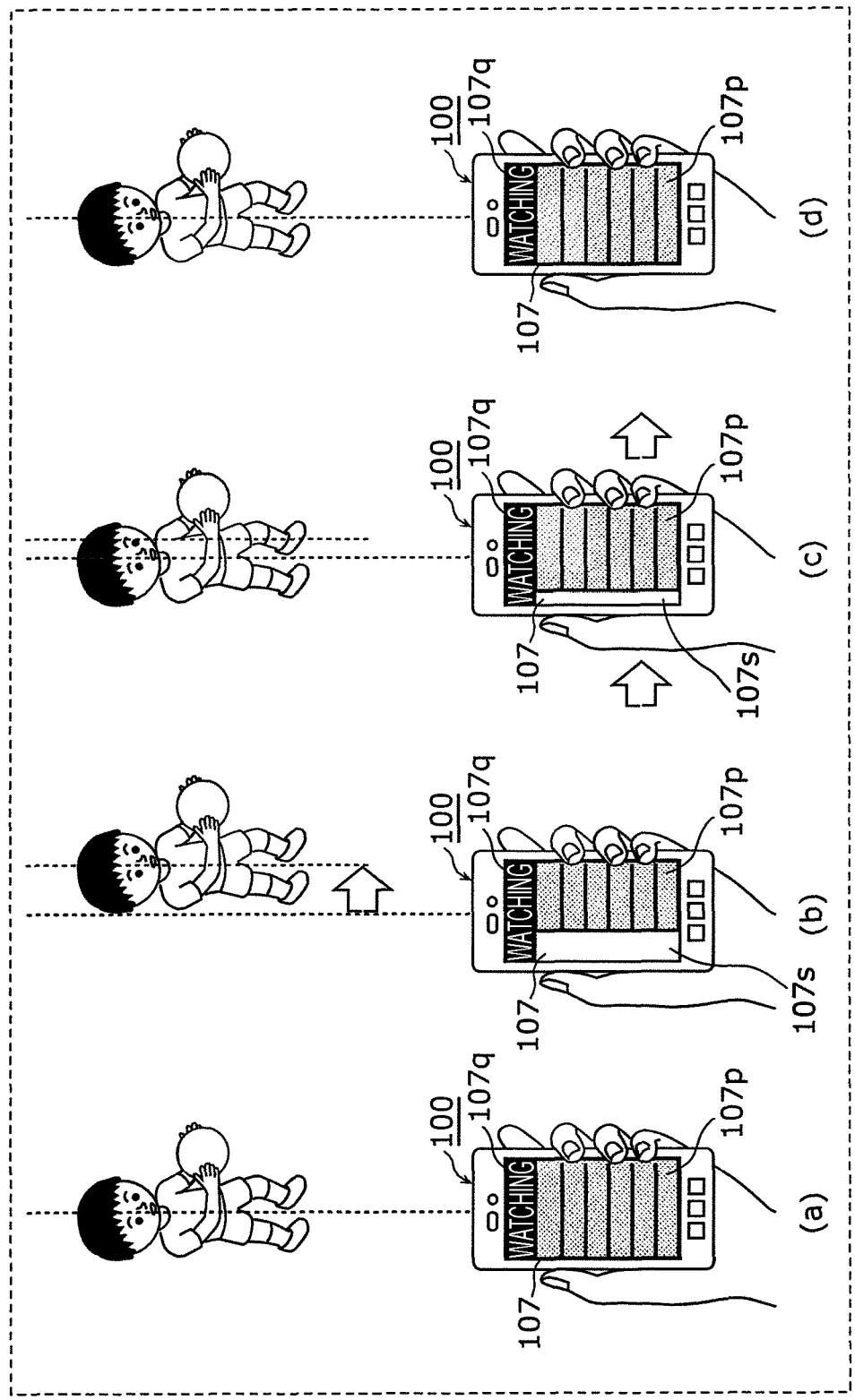
FIG. 6 is a diagram illustrating an example of an application image controlled on the basis of a position of the watching target according to the first embodiment.

FIG. 6 illustrates an example of the application image controlled on the basis of the position of the watching target.

As illustrated in FIG. 6(*a*), for example, if the watching target is located at the center of a camera image, the display control unit 106 displays an application image 107*p*, which does not include a camera image, on the entirety of the display 107. The entirety of the display 107 here corresponds to the screen. At this time, the display control unit 106 may display a message 107q, "Watching", on the display 107 in order to inform the user that the display 107 is being controlled in accordance with the position of the determined watching target.

On the other hand, as illustrated in FIG. 6(b), if the watching target is not located at the center of the camera image, the display control unit 106 moves the application image 107p from the center of the display 107 in the direction of the watching target relative to the center of the camera image. As the relative distance of the watching target becomes larger, the display control unit 106 may move the application image 107p farther from the center of the display 107.

As illustrated in FIG. 6(b), for example, if the watching target moves to the right, the position detection unit 104 detects the relative distance and direction of the watching target in the camera image. In this case, the relative direction of the watching target is the right. The display control unit 106 moves the application image 107p in the relative direction of the watching target, that is, to the right, from the center of the display 107. The position detection unit 104 and the display control unit 106 perform the same process when the user has moved the watching apparatus 100 to the left.

When moving the application image 107p, the display control unit 106 displays a peripheral image 107s, which is an image different from the application image 107p. As illustrated in FIG. 6(a), for example, if the watching target is located at the center of a camera image, the display control unit 106 displays the application image 107p on the entirety of the display 107 as usual and does not display the peripheral image 107s. On the other hand, as illustrated in FIG. 6(b), if the watching target moves to the right in a camera image, the display control unit 106 moves the application image 107p to the right. At this time, the display control unit 106 displays the peripheral image 107s, which is not the application image 107p, in a left part (more specifically, pixels in the left part) of the display 107 without displaying the application image 107p in the left part. The peripheral image 107s is, for example, a black, white, or randomly colored image indicating information independent of the content of the application image 107p. If the watching apparatus 100 is a smartphone, the peripheral image 107s may be a part of a menu screen. Alternatively, the peripheral image 107s may be a part of a camera image or a camera video image. Displaying the peripheral image 107s will also be referred to as, for example, "masking an image".

When the application image 107p moves, a part of the application image 107p displayed on the display 107 becomes smaller than when the application image 107p is displayed on the entirety of the display 107. That is, a part of the application image 107p goes out of the frame on the display 107. At this time, the size of the application image 107p may be reduced in order to fully display information included in the application image 107p. That is, if the watching target is not located at the center of a camera image, the display control unit 106 moves the application image 107p in the direction of the watching target relative to the center of the camera image and reduces the size of the application image 107p. For example, the display control unit 106 reduces the width of the application image 107p. Alternatively, the display control unit 106 reduces the width of a part of the application image 107p, that is, for example, the width of a part (e.g., a peripheral part) of the application image 107p on a side opposite to the peripheral image 107s. In this case, the part of the application image 107p is deformed.

The size of the application image 107p is thus reduced when the display 107 is moved to the right or left. As a result, a ratio of the part of the application image 107p that goes out of the frame when the application image 107p is moved can be reduced. The ratio here refers to a ratio of the area of the part of the application image 107p that goes out of the frame to the area of the entirety of the application image 107p. Even when the application image 107p has been moved, therefore, the user can still understand the content of the application image 107p.

As illustrated in FIG. 6(b), if the application image 107p is moved to the right, the user desires to return the application image 107p to its original position and, as illustrated in FIG. 6(c), moves the watching apparatus 100 to the right. Alternatively, the user tells the watching target to return to his/her original position, that is, to move to the left. As a result, the relative distance between the center of a camera image and the position of the watching target becomes smaller. If the position detection unit 104 detects that the relative distance has become smaller, the display control unit 106 moves the application image 107p to the left in accordance with the relative distance. As a result, the width of the peripheral image 107s is reduced, and the part of the application image 107p displayed on the display 107 becomes larger. A small portion of the application image 107p, however, has not still been displayed. In other words, the application image 107p is displayed differently in a small portion of the screen of the display 107. The application image 107p is not displayed on the entirety of the screen. That is, if the watching target is not located at the center of a camera image, a part of the screen in which the application image 107p is displayed becomes smaller than when the watching target is located at the center of a camera image.

Since the user desires to return the application image 107p to its original position, the user further moves the watching apparatus 100 to the right in the state illustrated in FIG. 6(c). Alternatively, the user tells the watching target to return to his/her original position, that is, to further move to the left. As a result, the relative distance between the center of the camera image and the position of the watching target becomes smaller than a certain value. That is, the watching target returns to the center of the camera image. As illustrated in FIG. 6(b), the display control unit 106 further moves the application image 107p to the left in accordance with the relative distance to display the application image 107p on the entirety of the display 107.

As described above, according to the present embodiment, the user can easily understand that the watching target is located at the center of a camera image when the application image 107p is displayed on the entirety of the display 107. That is, the user can understand that the watching target has not largely moved and is located at a safe position. If the application image 107p moves to the right, the user can easily understand that the watching target has moved to the right from the center of the camera image. On the other hand, if the application image 107p moves to the left, the user can easily understand that the watching target has moved to the left from the center of the camera image. If the application image 107p that has been displayed on the entirety of the display 107 moves to the right, for example, a right part of the application image 107p goes out of the frame. Since the user desires to view the right part, the user automatically moves the watching apparatus 100 to the right. As a result, the position of the watching target in a camera image becomes closer to the center of the camera image, and the right part that has not been displayed is displayed on the display 107 again. That is, the user can appropriately track and watch the watching target without particularly paying attention to the watching target, even while viewing the application image 107p.

Although the reference position is the center of a camera image in the above example, the reference position may be, as described above, the position of the watching target at the time when the determination unit 101 has determined the watching target. That is, if the watching target is located at the position in a camera image at the time when the determination unit 101 has determined the watching target, the display control unit 106 displays the application image 107p on the entirety of the display 107. On the other hand, if the watching target is not located at the position at the time when the determination unit 101 has determined the watching target, the display control unit 106 moves the application image 107p from the center of the display 107 in the direction of the watching target relative to the position in a camera image at the time when the determination unit 101 has determined the watching target.

Figure 7:
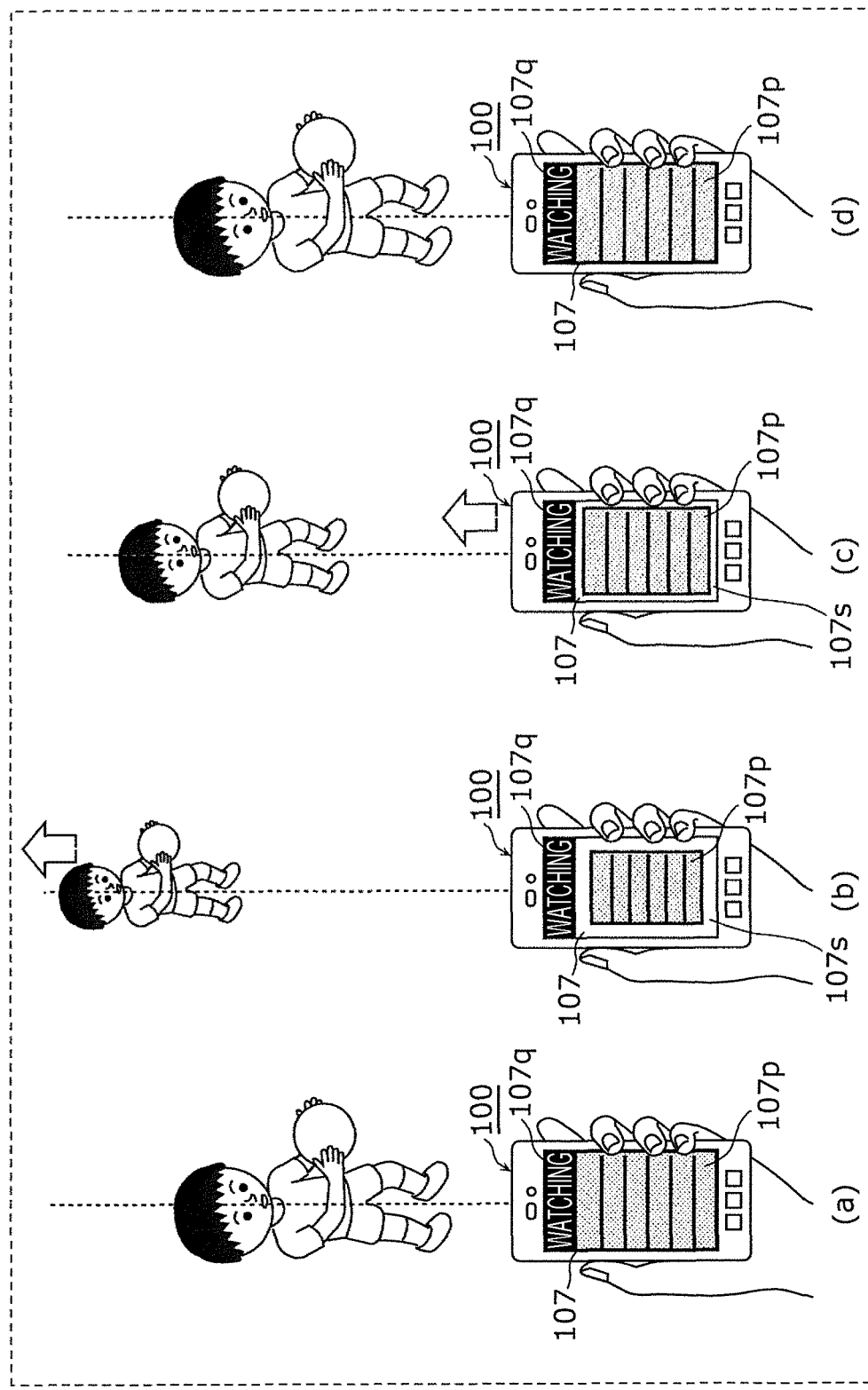
FIG. 7 is a diagram illustrating another example of the application image controlled on the basis of the position of the watching target according to the first embodiment.

FIG. 7 illustrates another example of the application image 107p controlled on the basis of the position of the watching target.

As illustrated in FIG. 7(a), if the watching target is located at the center of a camera image, the display control unit 106 displays the application image 107p on the entirety of the display 107.

Next, as illustrated in FIG. 7(b), the watching target moves away from the camera 103 (that is, the watching apparatus 100). As described above, the position detection unit 104 detects a change in the position of the watching target in a camera image in the depth direction. If the watching target moves away, therefore, the position detection unit 104 detects that the position of the watching target has become farther in the depth direction. At this time, the display control unit 106 reduces the size of the application image 107p around the center of the display 107. A change in the position of the watching target in the depth direction refers to a change from the above-mentioned reference depth position to the current position of the watching target. That is, the display control unit 106 reduces the size of the application image 107p by a ratio according to a distance in the depth direction between the reference depth position and the position of the watching target. When reducing the application image 107p, the display control unit 106 displays, on the display 107, the peripheral image 107s surrounding the application image 107p.

Since the reduced application image 107p is hard to view, the user moves toward the watching target as illustrated in FIG. 7(c). Alternatively, the user calls the watching target thereto. In this case, too, the position detection unit 104 detects a change in the position of the watching target in a camera image in the depth direction. The position detection unit 104, therefore, detects that the distance in the depth direction between the reference depth position and the current position of the watching target has become smaller. As a result, as illustrated in FIG. 7(c), the display control unit 106 enlarges the application image 107p illustrated in FIG. 7(b) on the display 107 around the center of the display 107. When enlarging the application image 107p, the display control unit 106 reduces the size of the peripheral image 107s displayed on the display 107.

In the example illustrated in FIG. 7(c), the watching target is still farther in the depth direction than the reference depth position. The application image 107p illustrated in FIG. 7(c), therefore, is not displayed on the entirety of the display 107 and the size thereof is smaller than that of the application image 107p illustrated in FIG. 7(a).

Since the application image 107p is still hard to view, the user further moves toward the watching target. Alternatively, the user further calls the watching target thereto. As a result, the position detection unit 104 determines that the position of the watching target in the depth direction matches the reference depth position. At this time, as illustrated in FIG. 7(d), the display control unit 106 enlarges the application image 107p illustrated in FIG. 7(c) around the center of the display 107 to display the application image 107p on the entirety of the display 107. When enlarging the application image 107p, the display control unit 106 hides the peripheral image 107s with the application image 107p.

As described above, according to the present embodiment, the user can easily understand that the watching target has moved away from the watching apparatus 100 in the depth direction on the basis of a reduction in the size of the application image 107p.

Figure 8:
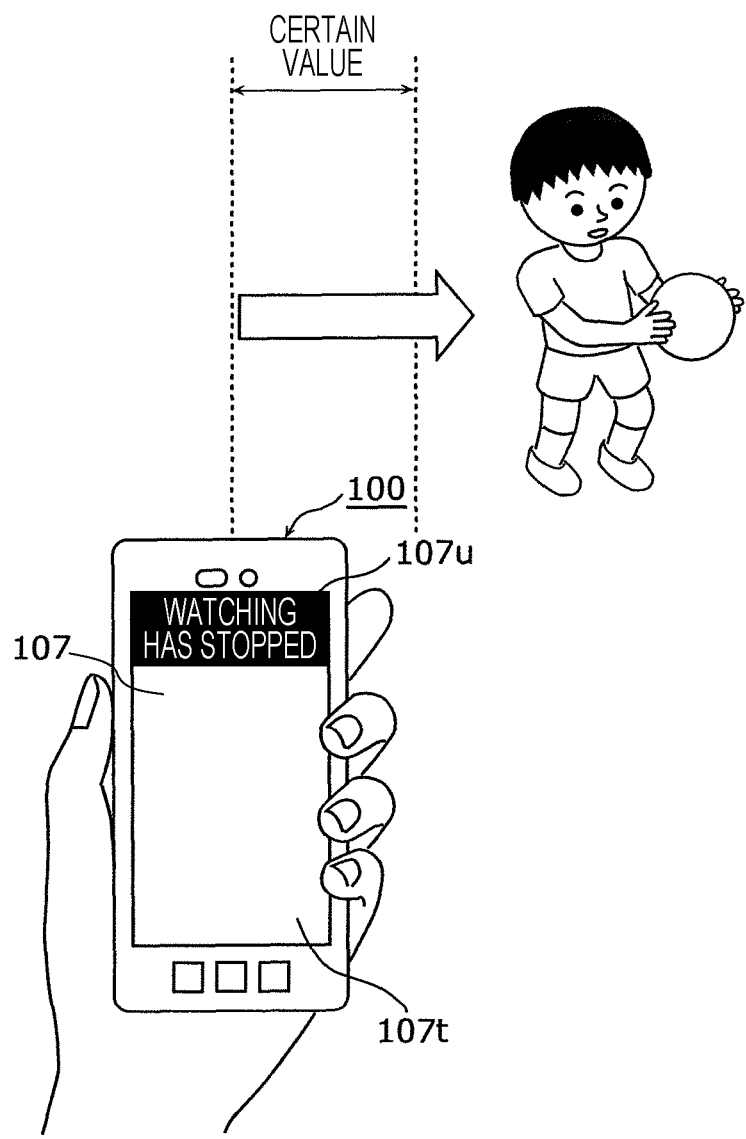
FIG. 8 is a diagram illustrating another example of the application image controlled on the basis of the position of the watching target according to the first embodiment.

FIG. 8 illustrates another example of the application image 107p controlled on the basis of the position of the watching target.

As illustrated in FIGS. 6 and 7, if the relative distance of the watching target is equal to or smaller than a certain value (a first threshold that will be described later), the display control unit 106 displays the application image 107p on the display 107 on the basis of the detected position of the watching target. On the other hand, as illustrated in FIG. 8, if the relative distance of the watching target is larger than the certain value, the display control unit 106 displays a camera image 107t on the display 107. That is, in this case, the display control unit 106 hides the application image 107p and displays the camera image 107t on the display 107. As a result, the user can no longer view or operate the application image 107p. The display control unit 106 may display, on the display 107 in addition to the camera image 107t, a message 107u for informing the user that the control of the application image 107p based on the position of the watching target has stopped. The message 107u is, for example, "Watching has stopped".

Since the application image 107p switches to the camera image 107t, the user is warned that the watching target has gone far. That is, because of the switching to the camera image 107t, the user can easily understand that the watching target has gone far and might not be safe. The user who has received the warning can immediately watch the watching target directly.

Figure 9:
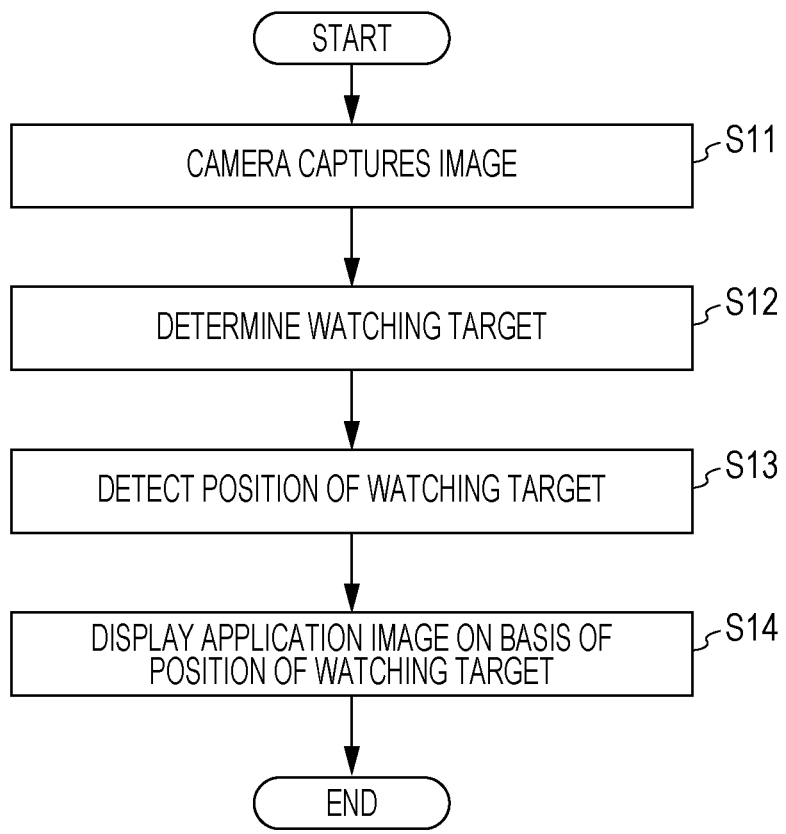
FIG. 9 is a flowchart illustrating a watching method according to the first embodiment.

FIG. 9 is a flowchart illustrating a watching method according to the present embodiment.

The watching method according to the present embodiment is a method for controlling the display 107 used by the watching apparatus 100 including the display 107 and the camera 103 and includes steps S11 to S14.

Step S11

The camera 103 captures a camera image.

Step S12

The determination unit 101 determines the watching target in the camera image captured by the camera 103.

Step S13

The position detection unit 104 detects the position of the watching target in the camera image.

Step S14

The display control unit 106 displays the application image 107p, which does not include a camera image, on the display 107 on the basis of the detected position of the watching target.

Figure 10:
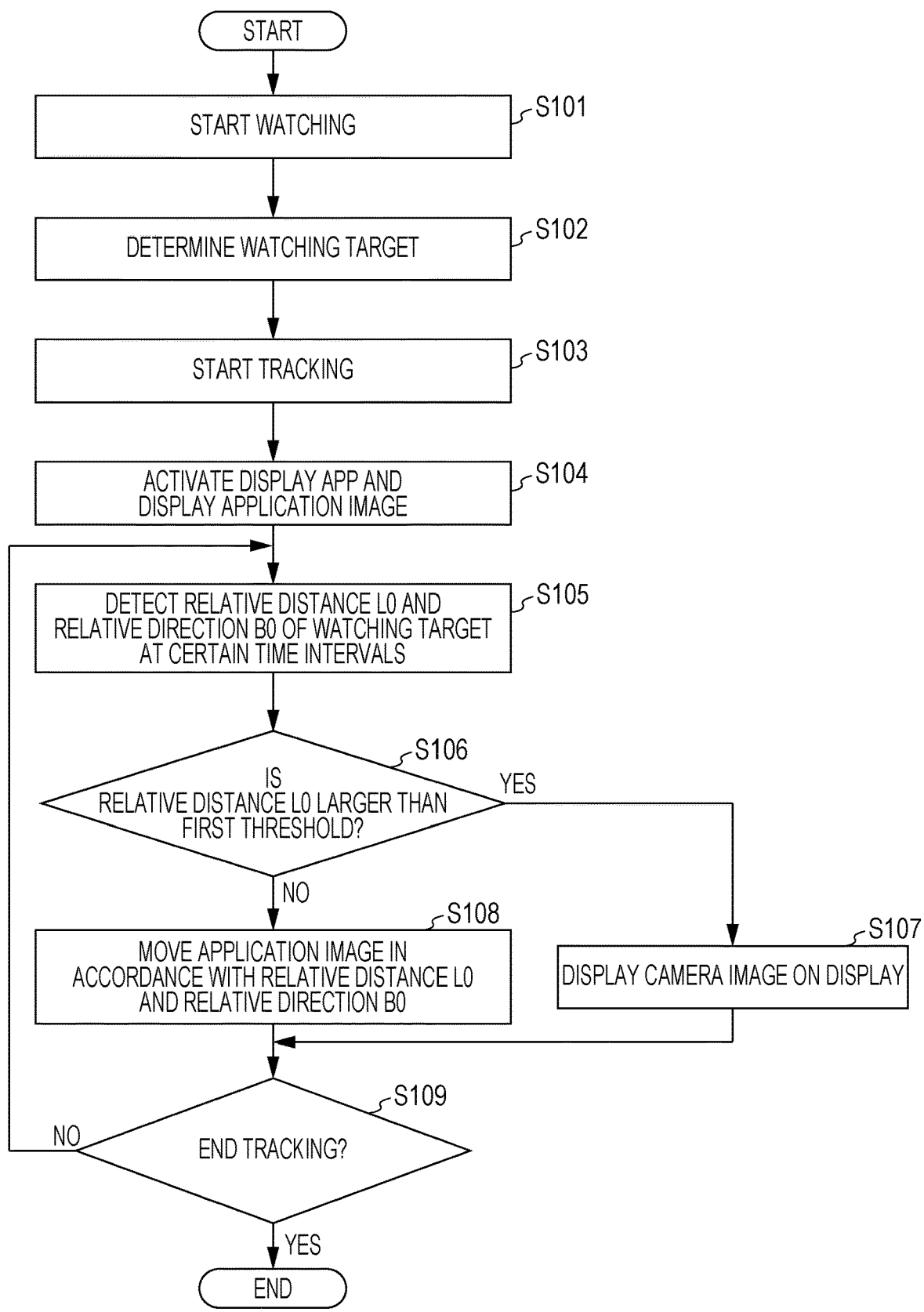
FIG. 10 is a flowchart specifically illustrating the watching method according to the first embodiment.

FIG. 10 is a flowchart specifically illustrating the watching method according to the present embodiment.

Step S101

The watching apparatus 100 starts the watching. The watching apparatus 100 starts the watching, for example, when the watching apparatus 100 receives an operation for activating an application or an operation for starting the watching is performed in the application. More specifically, the watching apparatus 100 displays a menu screen on the display 107. If the user touches an icon of the application displayed on the menu screen, the watching apparatus 100 receives an operation for activating the application. The watching apparatus 100 thus starts the watching. After the watching starts in step S101, the camera 103 captures a camera image. The camera image illustrated in FIG. 3 or 4, for example, is displayed on the display 107. More specifically, the display control unit 106 displays the camera image captured by the camera 103 on the display 107.

Step S102

The determination unit 101 determines the watching target in the camera image. For example, the determination unit 101 determines a candidate located closest to a position at which the user has touched the display 107 as the watching target. The determination unit 101 thus determines the watching target on the basis of the position at which the user has touched the display 107 while the display 107 is displaying the camera image.

Alternatively, the determination unit 101 may recognizes a person or an animal at the center of the display 107 and determine the recognized person or animal as the watching target. Alternatively, if the camera image includes a plurality of candidates, the determination unit 101 may determine, as the watching target, a candidate located closest to the center of the display 107 in the camera image and remaining at the position for a certain period of time. Alternatively, the determination unit 101 may perform face recognition using a face image of a registered person (e.g., a child) and determine a person whose face is similar to the face image as the watching target. The determination unit 101, needless to say, may determine one of persons in the camera image selected by the user as the watching target.

Step S103

The position detection unit 104 detects the position of the watching target determined in step S102. That is, the position detection unit 104 begins to track the watching target.

Step S104

The display control unit 106 activates a display app in accordance with an operation performed by the user and displays the application image 107*p* used by the display app on the display 107. As described above, the display app is, for example, a web browser. More specifically, after the position detection unit 104 begins to track the watching target in step S103, the display control unit 106 displays a menu screen including icons corresponding to a plurality of applications on the display 107. If the user touches one of the plurality of icons, the display control unit 106 selects an application identified by the icon as the display app. The display control unit 106 then activates the display app to display the application image 107*p* on the display 107.

After the application image 107*p* is displayed in step S104, the application image 107*p* is repeatedly controlled in steps S105 to S109. In these steps, the application image 107*p*, which does not include a camera image, is displayed on the display 107 on the basis of the detected position of the watching target. A specific processing flow will be described hereinafter.

Step S105

The position detection unit 104 detects the position of the watching target at certain time intervals to detect a relative distance L0 and a relative direction B0 of the watching target. As described above, the relative distance L0 refers to the distance between the reference position in a camera image and the position of the watching target. The relative direction B0 refers to the direction of the watching target in a camera image relative to the reference position. The reference position is the center of a camera image or a position of the watching target at the time when the determination unit 101 has determined the watching target. The relative distance L0 and the relative direction B0 change as the watching target moves and as the watching apparatus 100 moves.

Step S106

The display control unit 106 compares the detected relative distance L0 with the first threshold (that is, the certain value illustrated in FIG. 8), which is a predetermined distance. The display control unit 106 then determines whether the relative distance L0 is larger than the first threshold.

Step S107

If the display control unit 106 determines in step S106 that the relative distance L0 is larger than the first threshold (YES in step S106), the display control unit 106 hides the application image 107*p* as illustrated in FIG. 8 and displays the camera image 107*t* on the display 107. Since the camera image 107*t* is displayed on the display 107, the user stops looking at the display 107 of the watching apparatus 100 and tries to find the watching target, such as a child.

Step S108

If the display control unit 106 determines in step S106 that the relative distance L0 is not larger than the first threshold (NO in step S106), the display control unit 106 moves the application image 107*p* in accordance with the relative distance L0 and the relative direction B0 as illustrated in FIG. 6. Details of step S108 will be described in detail later with reference to FIGS. 11A to 11C.

Step S109

The watching apparatus 100 determines whether to end the watching. If the watching apparatus 100 receives an instruction to end the watching from the user, for example, the watching apparatus 100 determines that the watching is to be ended, and if not, the watching apparatus 100 determines that the watching is not to be ended. If the watching apparatus 100 determines that the watching is to be ended (YES in S109), the watching apparatus 100 ends the watching. On the other hand, if the watching apparatus 100 determines that the watching is not to be ended (NO in step S109), the watching apparatus 100 repeats the processing in step S105 and later. If step S105 is performed again, the position detection unit 104 detects the relative distance L0 and the relative direction B0 a certain period of time after a timing at which the position detection unit 104 has previously detected the relative distance L0 and the relative direction B0.

In the example illustrated in FIG. 10, the watching apparatus 100 performs a process for moving the application image 107*p* on the basis of the relative distance L0 and the relative direction B0 as the watching. As illustrated in FIG. 7, however, the watching apparatus 100 may perform a process for reducing the size of the application image 107*p* as the watching, instead, on the basis of the depth distance. In this case, the distance in the depth direction is calculated in step S105, and the size of the application image 107*p* is reduced in step S108 in accordance with the distance in the depth direction.

Figure 11A:
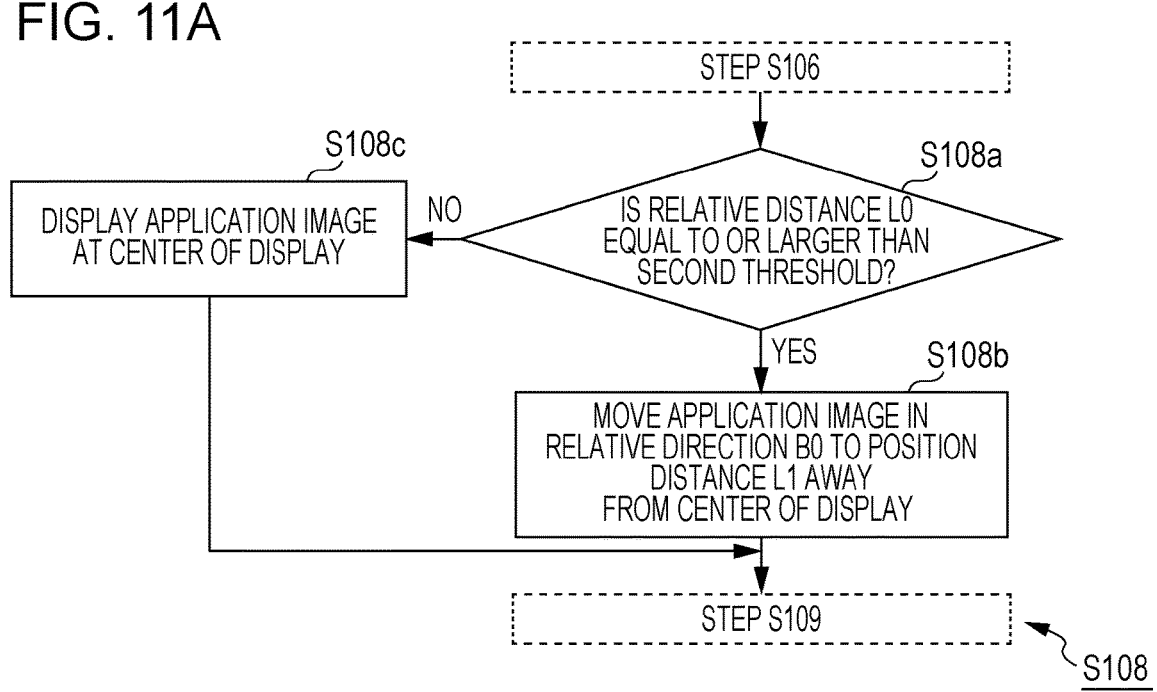
FIG. 11A is a flowchart illustrating a process for moving the application image in one stage according to the first embodiment.
Figure 11B:
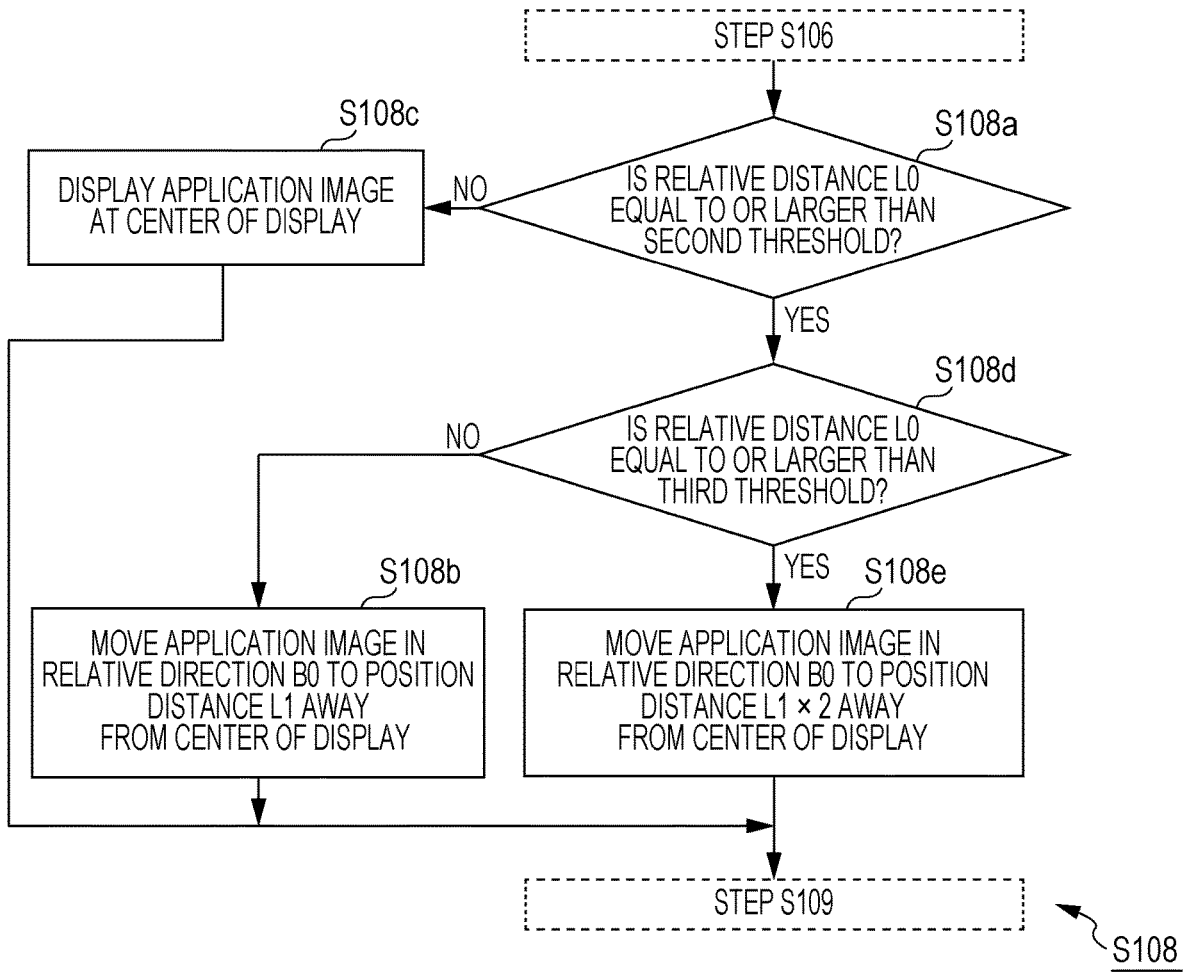
FIG. 11B is a flowchart illustrating a process for moving the application image in two stages according to the first embodiment.
Figure 11C:
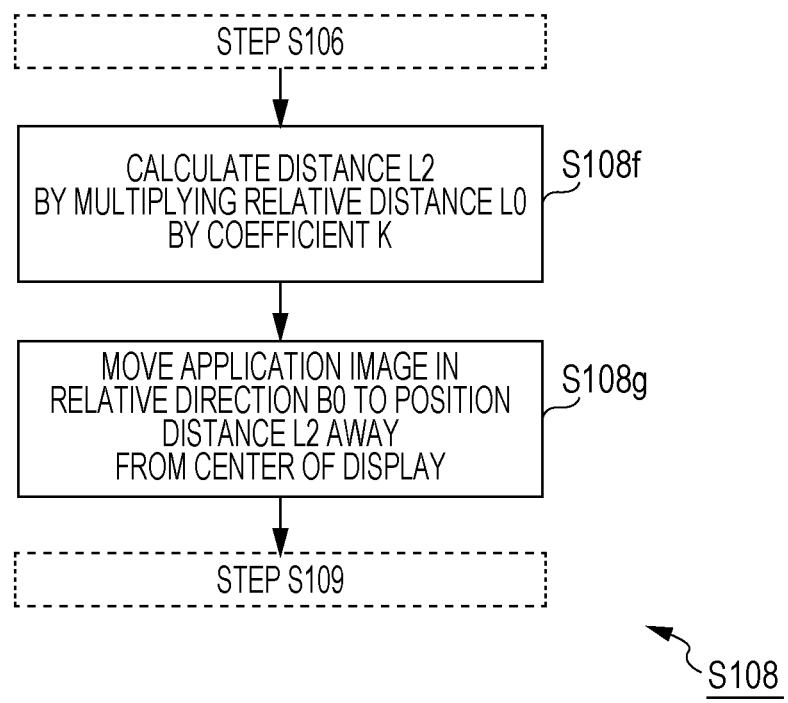
FIG. 11C is a flowchart illustrating a process for moving the application image to an arbitrary position according to a relative distance according to the first embodiment.

FIGS. 11A to 11C are flowcharts illustrating the details of step S108 in the flowchart illustrated in FIG. 10.

FIG. 11A illustrates a process for moving the application image 107*p* in one stage.

Step S108*a*

The display control unit 106 determines whether the relative distance L0 is equal to or larger than a second threshold. The second threshold is a predetermined value smaller than the first threshold.

Step S108*b*

If the display control unit 106 determines in step S108*a* that the relative distance L0 is equal to or larger than the second threshold (YES in step S108*a*), the display control unit 106 moves the application image 107*p*. More specifically, the display control unit 106 moves the application image 107*p* to a position a distance L1 away from the center of the display 107 in the relative direction B0. The distance L1 is a predetermined distance.

Step S108*c*

If the display control unit 106 determines in step S108*a* that the relative distance L0 is smaller than the second threshold (NO in step S108), the display control unit 106 displays the application image 107*p* at the center of the display 107. That is, the display control unit 106 displays the application image 107*p* on the entirety of the display 107.

As a result, if the relative distance L0 is smaller than the second threshold, the application image 107*p* is displayed at the center of the display 107. If the relative distance L0 is equal to or larger than the second threshold but equal to or smaller than the first threshold, the application image 107*p* is moved from the center of the display 107 by the distance L1. The application image 107*p* is thus moved in one stage in accordance with whether the relative distance L0 is equal to or larger than the second threshold.

FIG. 11B illustrates a process for moving the application image 107*p* in two stages.

Step S108*a*

The display control unit 106 determines whether the relative distance L0 is equal to or larger than the second threshold.

Step S108*c*

If the display control unit 106 determines in step S108*a* that the relative distance L0 is smaller than the second threshold (NO in step S108*a*), the display control unit 106 displays the application image 107*p* at the center of the display 107. That is, the display control unit 106 displays the application image 107*p* on the entirety of the display 107.

Step S108*d*

If the display control unit 106 determines in step S108*a* that the relative distance L0 is equal to or larger than the second threshold (YES in step S108*a*), the display control unit 106 further determines whether the relative distance L0 is equal to or larger than a third threshold. The third threshold is a predetermined value larger than the second threshold but smaller than the first threshold.

Step S108*e*

If the display control unit 106 determines in step S108*d* that the relative distance L0 is equal to or larger than the third threshold (YES in step S108*d*), the display control unit 106 moves the application image 107*p*. More specifically, the display control unit 106 moves the application image 107*p* to a position the distance L1×2 away from the center of the display 107 in the relative direction B0. The distance L1×2 is a distance twice as large as the distance L1.

Step S108*b*

If the display control unit 106 determines in step S108*d* that the relative distance L0 is smaller than the third threshold (NO in step S108*d*), the display control unit 106 moves the application image 107*p* to the position the distance L1 away from the center of the display 107 in the relative direction B0.

As a result, if the relative distance L0 is smaller than the second threshold, the application image 107*p* is displayed at the center of the display 107. If the relative distance L0 is equal to or larger than the second threshold but smaller than the third threshold, however, the application image 107*p* is moved from the center of the display 107 by the distance L1. If the relative distance L0 is equal to or larger than the third threshold but equal to or smaller than the first threshold, the application image 107*p* is moved from the center of the display 107 by the distance L1×2. The application image 107*p* is thus moved in two stages, namely first to the position the distance L1 away from the center of the display 107 and then to the position the distance L1×2 away from the center of the display 107, in accordance with the relative distance L0.

FIG. 11C illustrates a process for moving the application image 107*p* to an arbitrary position according to the relative distance L0.

Step S108*f*

The display control unit 106 calculates a distance L2 by, for example, multiplying the relative distance L0 by a predetermined coefficient K.

Step S108*g*

The display control unit 106 moves the application image 107*p* to a position the distance L2 away from the center of the display 107 in the relative direction B0.

As a result, the application image 107*p* moves to an arbitrary position according to the relative distance L0 continuously, not stepwise.

In this example, the display control unit 106 moves the application image 107*p* farther from the center of the display 107 as the relative distance L0 becomes larger. That is, as the relative distance L0 of the watching target becomes larger, the application image 107*p* is moved farther from the center of the display 107. As a result, the user can easily understand how much the watching target has moved on the basis of how much the application image 107*p* has been moved from the center of the display 107.

Advantageous Effects Produced by First Embodiment

The watching apparatus 100 according to the present embodiment includes the housing 105, the display 107, the camera 103, the determination unit 101, the position detection unit 104, and the display control unit 106. The display 107 is arranged on the housing 105. The camera 103 is arranged on the housing 105. The determination unit 101 determines the watching target in a camera image captured by the camera 103. The position detection unit 104 detects the position of the watching target in the camera image. The display control unit 106 displays the application image 107*p*, which does not include the camera image, on the display 107 on the basis of the detected position of the watching target.

In the present embodiment, the application image 107*p* is displayed on the basis of the position of the watching target in a camera image. Since the application image 107*p* is controlled in accordance with the position of the watching target, the user can understand the position of the watching target even if the user is attracted to the content of the application image 107*p*. As a result, the user can appropriately watch the watching target.

In addition, in the present embodiment, the display control unit 106 moves the application image 107p on the display 107 on the basis of the position of the watching target.

Since the application image 107p is moved in accordance with the position of the watching target, the user can easily understand a change in the position of the watching target, that is, the movement of the watching target, on the basis of the movement of the application image 107p. In addition, the position of the watching target is a position relative to the camera 103. The user, therefore, can track the watching target by moving the watching apparatus 100 including the camera 103 in accordance with the movement of the application image 107p. As a result, by keeping the application image 107p at the same position, the user can track the watching target while viewing the application image 107p.

Second Embodiment

A watching apparatus according to the present embodiment changes a moving distance of the application image 107p in accordance with not only the position of the watching target such as a child but also how often the user is watching the watching target.

FIG. 12 is a diagram illustrating a functional configuration of the watching apparatus according to the present embodiment.

A watching apparatus 200 according to the present embodiment includes a display control unit 106a instead of the display control unit 106 of the watching apparatus 100 according to the first embodiment. The watching apparatus 200 also includes a sub-camera 113 and an attention determination unit 114. That is, the watching apparatus 200 includes the housing 105, the determination unit 101, the timer 102, the camera 103, the position detection unit 104, the display control unit 106a, the display 107, the storage unit 108, the sub-camera 113, and the attention determination unit 114.

Sub-Camera 113

The sub-camera 113 is arranged on the housing 105. More specifically, as with the display 107, the sub-camera 113 is provided on the front surface of the housing 105. Since the sub-camera 113 is provided on the front surface of the housing 105, the sub-camera 113 can capture, as a subject, an image of the face of the user who is looking at the display 107. The sub-camera 113 may be activated at the same time as the camera 103.

Attention Determination Unit 114

The attention determination unit 114 determines whether the user is paying attention to the watching target on the basis of the movement of at least a part of the user's face included in a sub-camera image captured by the sub-camera 113.

Figure 13:
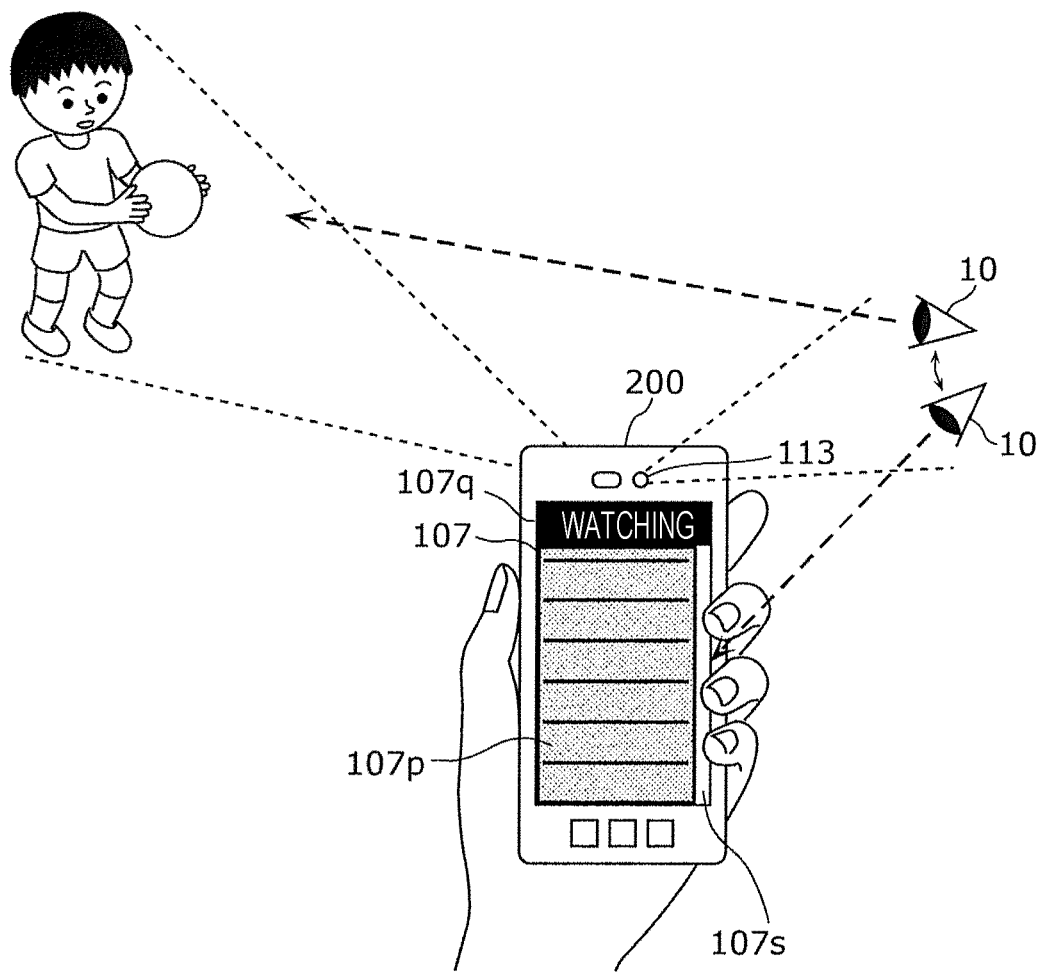
FIG. 13 is a diagram illustrating an application image controlled on the basis of the movement of the user's pupils according to the second embodiment.

FIG. 13 illustrates the application image 107p controlled on the basis of the movement of the user's pupils.

More specifically, as illustrated in FIG. 13, the attention determination unit 114 detects the user's eyes in a sub-camera image captured by the sub-camera 113 and extracts pupils 10. If the pupils 10 move up and down for a certain number of times or more in a certain period of time, the attention determination unit 114 determines that the user is paying attention to the watching target. In other words, the attention determination unit 114 determines that the user's attention to the watching target is sufficient. On the other hand, if the pupils 10 do not move up and down the certain number of times or more in the certain period of time, the attention determination unit 114 determines that the user is not paying attention to the watching target. In other words, the attention determination unit 114 determines that the user's attention to the watching target is insufficient.

Display Control Unit 106a

If the attention determination unit 114 determines that the user is paying attention to the watching target, the display control unit 106a displays the application image 107p closer to the center of the display 107 than when the attention determination unit 114 determines that the user is not paying attention to the watching target.

That is, if the attention determination unit 114 determines that the user is not paying attention to the watching target, the display control unit 106a performs the same process that the display control unit 106 according to the first embodiment does. More specifically, as illustrated in FIGS. 11A to 11C, the display control unit 106a moves the application image 107p to the position the distance L1, the distance L1×2, or the distance L2 away from the center of the display 107 depending on with the situation.

On the other hand, if the attention determination unit 114 determines that the user is paying attention to the watching target, the display control unit 106a displays the application image 107p at a position a distance smaller than the distance L1 away from the center of the display 107 in step S108b illustrated in FIG. 11A or 11B. Alternatively, the display control unit 106a displays the application image 107p at a position a distance smaller than the distance L1×2 away from the center of the display 107 in step S108e illustrated in FIG. 11B. Alternatively, the display control unit 106a displays the application image 107p at a position a distance smaller than the distance L2 away from the center of the display 107 in step S108g illustrated in FIG. 11C.

In the present embodiment, therefore, if the user is paying attention to the watching target, the moving distance of the application image 107p is smaller and the peripheral image 107s is smaller than in the first embodiment.

Although whether the user is paying attention to the watching target is determined on the basis of the movement of the eyes or the pupils 10 in the present embodiment, the determination may be made on the basis of the movement of the user's face, instead. If the attention determination unit 114 determines that the user is paying attention to the watching target, the display control unit 106a may display the application image 107p on the entirety of the display 107 regardless of the position or the relative distance of the watching target. That is, if the attention determination unit 114 determines that the user is paying attention to the watching target, the display control unit 106a displays the application image 107p at the center of the display 107.

Advantageous Effects Produced by Second Embodiment

As described above, in the present embodiment, the attention determination unit 114 determines whether the user is paying attention to the watching target on the basis of the movement of at least a part of the user's face included in a sub-camera image captured by the sub-camera 113. If attention determination unit 114 determines that the user is paying attention to the watching target, the display control unit 106a displays the application image 107p closer to the center of the display 107 than when the attention determination unit 114 determines that the user is not paying attention to the watching target.

Since the application image 107p is displayed closer to the center of the display 107 when the user is paying attention to the watching target, it is possible to prevent the application image 107p from meaninglessly becoming hard to view. That is, the application image 107p remains easy to view for a user who is paying attention to the watching target.

Modification of First and Second Embodiments

In the first and second embodiments, the user needs to hold the watching apparatus 100 or 200 upright so that the housing 105 or the display 107 becomes vertical, in order to capture an image of the watching target as a subject of the camera 103. In a modification of the first and second embodiments, an attachment is provided for the watching apparatus 100 (200) so as to capture an image of the watching target as a subject even when the watching apparatus 100 (200) is inclined. Although an example in which an attachment is provided for the watching apparatus 100 will be described hereinafter, the same holds for a case in which the attachment is provided for the watching apparatus 200.

Figure 14A:
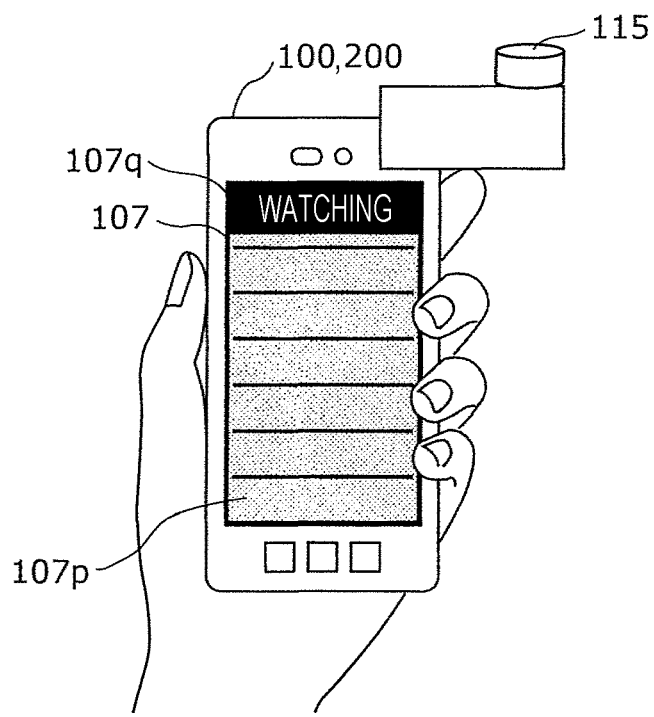
FIG. 14A is a diagram illustrating an example of the appearance of a watching apparatus provided with an attachment according to a modification of the first and second embodiments.

FIG. 14A illustrates an example of the appearance of the watching apparatus 100 for which the attachment is provided.

An attachment 115 includes an optical member such as a lens or a mirror and mounted on the watching apparatus 100 in such a way as to cover the camera 103. The attachment 115 receives external light parallel to a surface of the display 107 and emits the light to the camera 103 through reflection or refraction from the optical member.

Figure 14B:
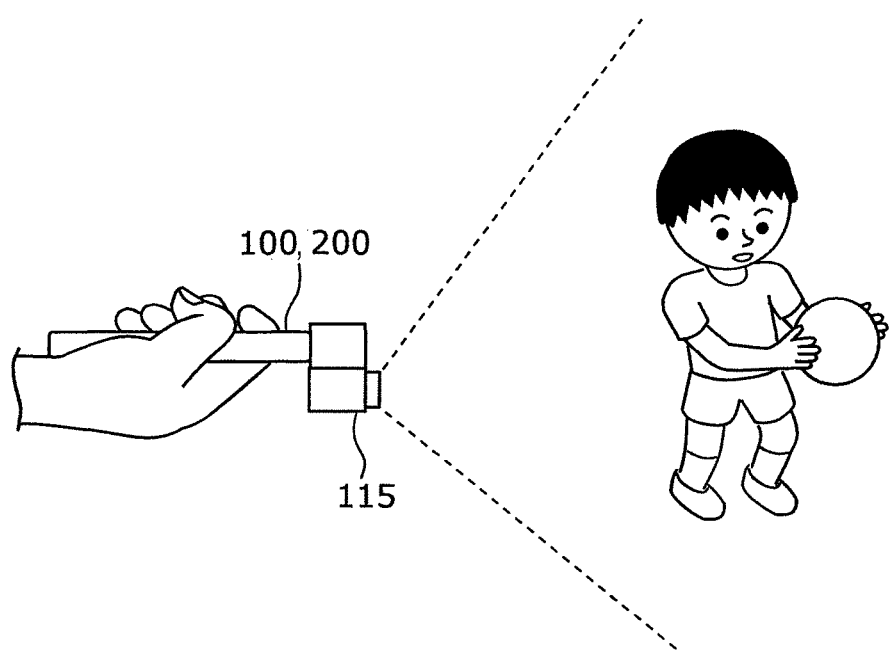
FIG. 14B is a diagram illustrating a state in which a camera of the watching apparatus captures an image through the attachment according to the modification of the first and second embodiments.

FIG. 14B illustrates a state in which the camera 103 of the watching apparatus 100 captures an image through the attachment 115.

As described above, the attachment 115 receives external light parallel to the surface of the display 107. The user, therefore, can make the watching apparatus 100 watch the watching target with the watching apparatus 100 inclined, that is, for example, with the housing 105 and the display 107 horizontal, as illustrated in FIG. 14B. That is, the user need not raise the watching apparatus 100 to a level of his/her face in order to make the watching apparatus 100 watch the watching target while viewing the application image 107p displayed on the display 107. The user can simultaneously watch the watching target and view the application image 107p by raising the watching apparatus 100 to chest level and directing the display 107 upward, that is, in a comfortable posture.

Although a watching apparatus and a watching method according to one or a plurality of aspects have been described on the basis of the above embodiments, the present disclosure is not limited to the above embodiments. Embodiments obtained by modifying the above embodiments in various ways conceived by those stilled in the art and embodiments constructed by combining components in different embodiments with each other may be included in the present disclosure, insofar as the scope of the present disclosure is not deviated from.

Although the application image 107p is moved on the basis of the position of the watching target in the first and second embodiments and the modification, a display target other than the position of the application image 107p may be changed, instead. For example, a part of the application image 107p may be deformed, blurred, or recolored. If the watching target moves to the right from the center of a camera image, for example, a mode in which a right part of the application image 107p is displayed may be changed.

In the first and second embodiments and the modification, when the application image 107p is moved on the basis of the position of the watching target, a part of the application image 107p goes out of the frame on the display 107. The part of the application image 107p, however, may be deformed, instead, in order to make the application image 107p hard to view. Alternatively, when letters are displayed in the part of the application image 107p, intervals between the letters may be decreased.

In the above embodiments and modification, the components may be achieved by dedicated hardware or a software program that suits the components. Alternatively, the components may be achieved by a program execution unit such as a central processing unit (CPU) or a processor by reading and executing a software program recorded on a recording medium such as a hard disk or a semiconductor memory. The software program that achieves the watching apparatus according to each of the above embodiments and the modification is a computer program that causes a computer to perform the steps illustrated in the flowchart of one of FIGS. 10 to 11C.

In the present disclosure, part or all of the units and the devices or part or all of the functional blocks illustrated in the block diagram of FIG. 1 or 12 may be achieved by one or more electronic circuits including a semiconductor device, a semiconductor integrated circuit (IC), or a large-scale integration (LSI) circuit. The LSI circuit or the IC may be integrated on a single chip, or may be integrated by combining a plurality of chips. The functional blocks other than a storage device, for example, may be integrated on a single chip. Although the terms "LSI" and "IC" are used here, a term "system LSI", "very-large-scale integration (VLSI)", or "ultra-large-scale integration (ULSI)" might be used depending on a degree of integration. A field-programmable gate array (FPGA), which is programmed after an LSI circuit is fabricated, or a reconfigurable logic device, in which connection relationships inside an LSI circuit can be reconfigured or circuit sections inside an LSI circuit can be set up, may be used for the same purposes.

Furthermore, part or all of the functions or the operations of the units, the apparatuses, or part of the apparatuses can be achieved by a software process. In this case, software is recorded on one or more non-transitory recording media such as read-only memories (ROMs), optical discs, or hard disks. When a processor executes the software, the software causes the processor and peripheral devices to execute particular functions in the software. A system or an apparatus may include one or more non-transitory recording media on which the software is recorded, a processor, and a necessary hardware device such as an interface.

The present disclosure produces an effect of appropriately watching a watching target and can be applied to, for example, mobile phones, smartphones, tablet terminals, and the like.

What is claimed is:

1. A watching apparatus comprising:
   a housing;
   a display provided on a front surface of the housing;
   a camera provided on a back surface of the housing;
   a determiner that determines a watching target on a basis of a camera image captured by the camera, the camera image including an image of the watching target; and
   a display controller that displays an application image on the display on a basis of a position of the image of the watching target in the camera image,
   wherein, when the image of the watching target is located at a center of the camera image, the display controller displays only the application image in an entirety of a first area of the display, wherein, when the image of the watching target is not located at the center of the camera image, the display controller adjusts a position of the application image in the first area of the display such that only the adjusted application image and a peripheral image are displayed in the entirety of the first area of the display with the adjusted application image touching the peripheral image, wherein the application image is an image used by an application executed by the watching apparatus, and the application image does not include the camera image, and wherein when the image of the watching target is located at the center of the camera image, the display controller only displays the application image on the display without displaying the peripheral image.

2. The watching apparatus according to claim 1,
wherein the display controller adjusts the position of the application image in the first area of the display such that the application image is moved on a basis of the position of the image of the watching target, and
wherein the watching target is a person or an animal, and the application image is an image used by a browser, a mailer, a map application, a railroad or bus traffic information application, or a game.

3. The watching apparatus according to claim 1,
wherein, when the image of the watching target is not located at the center of the camera image, the display controller adjusts the position of the application image in the first area of the display such that the application image is moved from a center of the first area of the display in a direction of the image of the watching target relative to the center of the camera image.

4. The watching apparatus according to claim 1,
wherein, when the image of the watching target is not located at the center of the camera image, a relative distance between the center of the camera image and the position of the image of the watching target is further detected, and
wherein the display controller adjusts the position of the application image in the first area of the display such that the application image is moved farther from the center of the first area of the display as the relative distance becomes larger.

5. The watching apparatus according to claim 1,
wherein, when the image of the watching target is located at a position in the camera image at a time when the watching target has been determined, the display controller displays the application image in the entirety of the first area of the display, and
wherein, when the image of the watching target is not located at the position at the time when the watching target has been determined, the display controller adjusts the position of the application image in the first area of the display such that the application image is moved from a center of the first area of the display in a direction of the watching target relative to the position in the camera image at the time when the watching target has been determined.

6. The watching apparatus according to claim 1,
wherein, when the image of the watching target is not located at a center of the camera image, the display controller adjusts the position of the application image in the first area of the display such that the application image is moved in a direction of the image of the watching target relative to the center of the camera image and a size of the application image is reduced.

7. The watching apparatus according to claim 1,
wherein when a change in the position of the image of the watching target in the camera image in a depth direction is detected, the display controller adjusts the position of the application image in the first area of the display such that a size of the application image is reduced around a center of the first area of the display.

8. The watching apparatus according to claim 1,
wherein a relative distance between a center of the camera image and the position of the image of the watching target is detected, and
wherein, when the relative distance is larger than a certain distance, the display controller displays the camera image on the display, and when the relative distance is equal to or smaller than the certain distance, the display controller displays the application image on a basis of the detected position of the image of the watching target.

9. The watching apparatus according to claim 1, further comprising:
a sub-camera provided on the housing; and
an attention determiner that determines whether a user is paying attention to the watching target on a basis of movement of at least a part of a face of the user in a sub-camera image captured by the sub-camera,
wherein, when the attention determiner determines that the user is paying attention to the watching target, the display controller displays the application image closer to the center of the first area of the display than when the attention determiner has determined that the user is not paying attention to the watching target.

10. A watching method for controlling a display used by an apparatus that includes a housing, the display, and a camera, the watching method comprising:
capturing a camera image using the camera, which is provided on a back surface of the housing;
determining a watching target on a basis of the camera image, the camera image including an image of the watching image; and
displaying an application image on the display, which is provided on a front surface of the housing, on a basis of a position of the image of the watching target in the camera image,
wherein, in the displaying, when the image of the watching target is located at a center of the camera image, only the application image is displayed in an entirety of a first area of the display,
wherein, in the displaying, when the image of the watching target is not located at the center of the camera image, a position of the application image in the first area of the display is adjusted such that only the adjusted application image and a peripheral image are displayed is the entirety of the first area of the display with the adjusted application image touching the peripheral image,
wherein the application image is an image used by an application executed by the watching apparatus, and the application image does not include the camera image, and
wherein, in the displaying, when the image of the watching target is located at the center of the camera image, only the application image displayed on the display without the peripheral image being displayed.

11. The watching method according to claim 10,
wherein, in the displaying, the position of the application image is adjusted in the first area of the display such that the application image moves on a basis of the position of the image of the watching target, and wherein the watching target is a person or an animal, and the application image is an image used by a browser, a mailer, a map application, a railroad or bus traffic information application, or a game.

12. The watching method according to claim 10, wherein, in the displaying, when the image of the watching target is not located at the center of the camera image, the position of the application image in the first area of the display is adjusted such that the application image is moved from a center of the first area of the display in a direction of the image of the watching target relative to the center of the camera image.

13. The watching method according to claim 10, further comprising:

detecting, when the image of the watching target is not located at the center of the camera image, a relative distance between the center of the camera image and the position of the image of the watching target after the determining and before the displaying, wherein, in the displaying, the position of the application image in the first area of the display is adjusted such that the application image is displayed farther from the center of the display as the relative distance becomes larger.

14. The watching method according to claim 10, wherein, in the displaying, when the image of the watching target is located at a position in the camera image at a time when the watching target has been determined, the application image is displayed in the entirety of the first area of the display, and wherein, in displaying, when the image of the watching target is not located at the position at the time when the watching target has been determined, the position of the application image in the first area of the display is adjusted such that the application image is moved from a center of the first area of the display in a direction of the image of the watching target relative to the position in the camera image at the time when the watching target has been determined.

15. The watching method according to claim 10, wherein, in displaying, when the image of the watching target is not located at a center of the camera image, the position of the application image in the first area of the display is adjusted such that the application image is moved in a direction of the image of the watching target relative to the center of the camera image and a size of the application image is reduced.

16. The watching method according to claim 10, further comprising:

detecting a change in the position of the image of the watching target in the camera image in a depth direction after the determining and before the displaying, wherein, in the displaying, when the detecting the change in the position detects that the image of the watching target has moved away from the camera in the depth direction, the position of the application image in the first area of the display is adjusted such that a size of the application image is reduced around a center of the first area of the display.

17. The watching method according to claim 10, further comprising:

detecting a relative distance between a center of the camera image and the position of the image of the watching target, wherein, in the displaying, when the relative distance is larger than a certain distance, the camera image is displayed on the display, and when the relative distance is equal to or smaller than the certain distance, the application image is displayed on the display on a basis of the detected position of the image of the watching target.

18. The watching method according to claim 10, wherein the apparatus further includes a sub-camera, wherein the watching method further comprises determining whether a user is paying attention to the watching target on a basis of movement of at least a part of the user's face in a sub-camera image captured by the sub-camera, and wherein, when it is determined in the determining whether the user is paying attention that the user is paying attention to the watching target, the application image is displayed, in the displaying, closer to the center of the first area of the display than when it has been determined that the user is not paying attention to the watching target.

19. A watching apparatus comprising:

a housing;

a display provided on a front surface of the housing;

a camera provided on a back surface of the housing;

a determiner that determines a watching target on a basis of a camera image captured by the camera, the camera image including an image of the watching target; and a display controller that displays an application image on the display on a basis of a position of the image of the watching target in the camera image, wherein, when the image of the watching target is located at a center of the camera image, the display controller displays only the application image in an entirety of a first area of the display, wherein, when the image of the watching target is not located at the center of the camera image, the display controller adjusts a position of the application image in the first area of the display such that only the adjusted application image and a peripheral image are displayed in the entirety of the first area of the display, and wherein the application image is an image used by an application executed by the watching apparatus, and the application image does not include the camera image, and wherein when the application image is displayed on the display, only the application image is displayed on the display without displaying the camera image.

20. A watching method for controlling a display used by an apparatus that includes a housing, the display, and a camera, the watching method comprising:

capturing a camera image using the camera, which is provided on a back surface of the housing;

determining a watching target on a basis of the camera image, the camera image including an image of the watching image; and displaying an application image on the display, which is provided on a front surface of the housing, on a basis of a position of the image of the watching target in the camera image, wherein, in the displaying, when the image of the watching target is located at a center of the camera image, only the application image is displayed in an entirety of a first area of the display, wherein, in the displaying, when the image of the watching target is not located at the center of the camera image, a position of the application image in the first area of the display is adjusted such that only the adjusted application image and a peripheral image are displayed is the entirety of the first area of the display, and wherein the application image is an image used by an application executed by the watching apparatus, and the application image does not include the camera image, and wherein when the application image is displayed on the display, only the application image is displayed on the display without displaying the camera image.

* * * * *